United States Patent
Nishimoto et al.

(10) Patent No.: US 6,923,149 B2
(45) Date of Patent: Aug. 2, 2005

(54) CONTROL DEVICE FOR SPARK-IGNITION ENGINE

(75) Inventors: Toshiaki Nishimoto, Fuchu-cho (JP); Kouji Asanomi, Fuchu-cho (JP); Kouji Sumida, Fuchu-cho (JP); Takayoshi Hayashi, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 34 days.

(21) Appl. No.: 10/609,668

(22) Filed: Jul. 1, 2003

(65) Prior Publication Data

US 2004/0065278 A1 Apr. 8, 2004

(30) Foreign Application Priority Data

Jul. 2, 2002 (JP) .......................................... 2002-193548

(51) Int. Cl.[7] .............................................. F02M 25/07
(52) U.S. Cl. ........................................ 123/58.8; 123/64
(58) Field of Search .................................. 123/58.8, 64

(56) References Cited

U.S. PATENT DOCUMENTS

| 3,941,113 | A |   | 3/1976  | Baguelin        |          |
|-----------|---|---|---------|-----------------|----------|
| 4,194,472 | A |   | 3/1980  | Amano et al.    |          |
| 4,237,832 | A | * | 12/1980 | Hartig et al.   | 123/58.8 |
| 5,226,401 | A |   | 7/1993  | Clarke et al.   |          |
| 6,138,650 | A | * | 10/2000 | Bailey          | 123/568.12 |
| 6,178,933 | B1 | * | 1/2001  | Lavy           | 123/58.8 |
| 6,308,666 | B1 | * | 10/2001 | Drecq          | 123/58.8 |
| 6,386,154 | B1 | * | 5/2002  | Hellman et al. | 123/58.8 |
| 6,425,381 | B1 | * | 7/2002  | Rammer         | 123/568.12 |
| 6,431,128 | B1 | * | 8/2002  | Dabadie        | 123/58.8 |

FOREIGN PATENT DOCUMENTS

| DE | 100 14 850 A1 | 9/2001 |
| EP | 0 421 481 A1  | 4/1991 |
| JP | 10-274085     | 10/1998 |
| JP | 2003-227383   | 8/2003 |
| WO | WO 03/064837  | 8/2003 |

OTHER PUBLICATIONS

European Search Report dated Nov. 3, 2003.

* cited by examiner

Primary Examiner—Henry C. Yuen
Assistant Examiner—Jason Benton
(74) Attorney, Agent, or Firm—Nixon Peabody LLP; Donald R. Studebaker

(57) ABSTRACT

A control device for a multicylinder spark-ignition engine includes a flow path switching unit for switching intake and exhaust flow paths between a two-cylinder interconnect configuration and an independent cylinder configuration and an air-fuel ratio control unit. In a low-load, low-speed operating range, the flow path switching unit switches the engine to the two-cylinder interconnect configuration, and the air-fuel ratio control unit produces a lean mixture having an air-fuel ratio larger than the stoichiometric air-fuel ratio by a specific amount in preceding cylinders by injecting fuel thereinto and an air-fuel ratio approximately equal to the stoichiometric air-fuel ratio in following cylinders by supplying fuel together with burned gas of a lean mixture state discharged from the preceding cylinders into the following cylinders to perform combustion in special operation mode. At engine startup, the flow path switching unit switches the engine to the independent cylinder configuration to perform combustion in normal operation mode.

7 Claims, 14 Drawing Sheets

FIG. 5
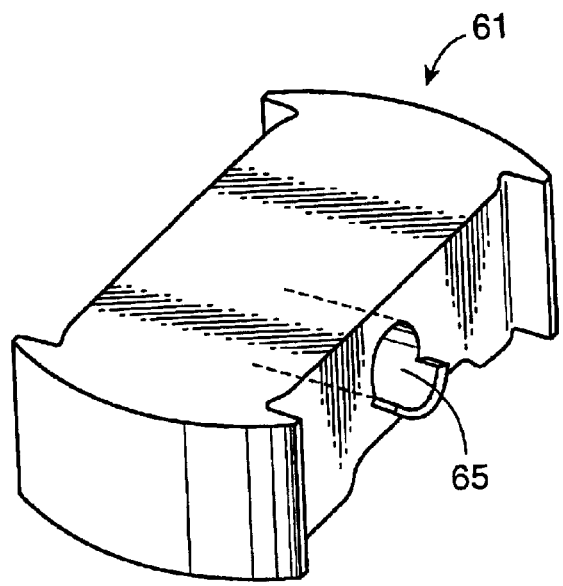
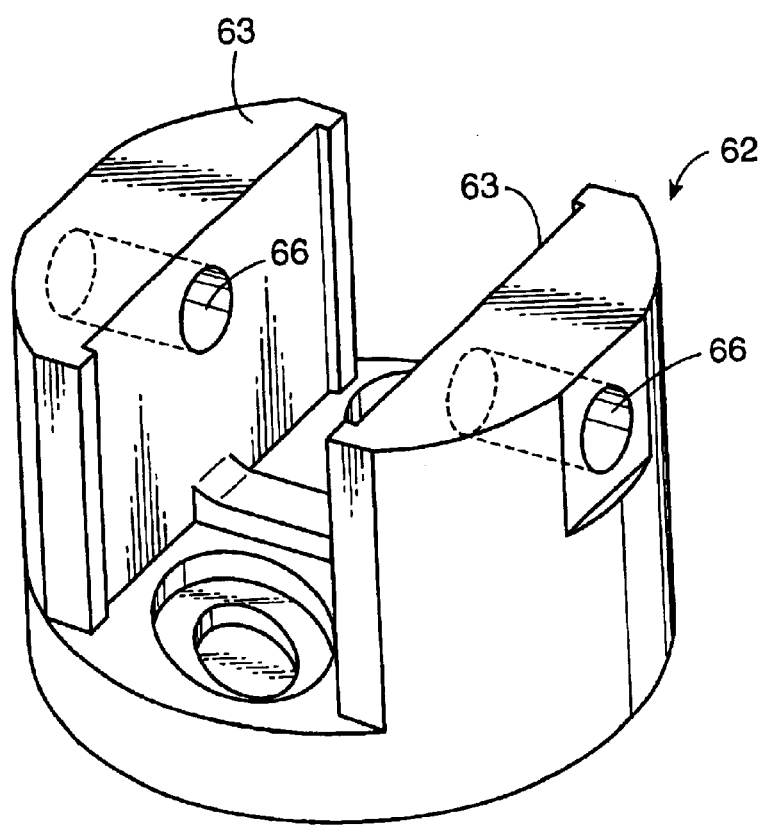

CONTROL DEVICE FOR SPARK-IGNITION ENGINE

BACKGROUND OF THE INVENTION

1. Field of the Invention

The present invention relates to a control device for a spark-ignition engine and, in particular, to a control device for controlling conditions of combustion in individual cylinders to improve fuel economy and characteristics of emissions in a multicylinder engine.

2. Description of the Related Art

There is known a conventional technique for achieving an improvement in fuel economy by burning a lean mixture in individual cylinders of a spark-ignition engine at an air-fuel ratio larger than the stoichiometric air-fuel ratio. An example of this kind of technique is disclosed in Japanese Unexamined Patent Publication No. H10-274085. The technique of the Publication employs fuel injectors for injecting fuel directly into combustion chambers to produce stratified charge combustion by injecting fuel during a compression stroke in a low-speed, low-load range, for example, to thereby accomplish extremely lean mixture combustion.

In this type of engine, it is impossible to achieve sufficient emission-cleaning performance with respect to nitrogen oxides (NOx) under lean burn operating conditions by using an ordinary three-way catalyst alone, which is a catalyst having high performance to convert hydrocarbons (HC), carbon monoxide (CO) and NOx at about the stoichiometric air-fuel ratio, as an emission-cleaning converter. Therefore, as shown in the aforementioned Publication, the engine is provided with a lean NOx catalyst which adsorbs NOx in an oxygen-rich atmosphere and releases and reduces NOx in an atmosphere where oxygen concentration has decreased. If the amount of NOx adsorbed by the lean NOx catalyst has increased under the lean burn operating conditions when the lean NOx catalyst of this kind is being used, the fuel is injected not only for primary combustion but an additional amount of fuel is injected during an expansion stroke to lower the air-fuel ratio and generate CO for accelerating release and reduction of NOx as shown in the aforementioned Publication, for example.

In the aforementioned engine which performs conventional lean burn operation, it is necessary to provide the lean NOx catalyst in an exhaust passage to offer NOx-converting performance during the lean burn operating conditions. This type of engine also requires the three-way catalyst for cleaning emissions in such engine operating ranges as a high-load range in which the engine is operated at the stoichiometric air-fuel ratio. Thus, the three-way catalyst is provided together with the lean NOx catalyst in the exhaust passage. The lean NOx catalyst, which needs to have a relatively large capacity to provide a capability to adsorb some amount of NOx, is expensive compared to the three-way catalyst, so that the provision of the lean NOx catalyst is disadvantageous from the viewpoint of product cost.

Furthermore, it is necessary to temporarily lower the air-fuel ratio by supplying an additional amount of fuel to accelerate release and reduction of NOx at specific intervals of time when the amount of NOx adsorbed increases as stated above in order to maintain the converting performance of the lean NOx catalyst. This occurs rather frequently, resulting in deterioration of fuel economy improvement effects offered by lean burn operation.

In addition, the lean NOx catalyst is susceptible to poisoning by sulfurization if the used fuel contains high sulfur content. The lean NOx catalyst should therefore be subjected to regeneration treatment, such as catalyst heating and feeding of a reducing agent, to prevent this sulfur-poisoning problem. This regeneration treatment of the lean NOx catalyst is likely to jeopardize the fuel economy improvement effect and reduce its durability.

Under these circumstances, the inventors of the present invention previously filed Japanese Patent Application No. 2002-024548, which disclosed a technique concerning a control device for a spark-ignition engine capable of providing improved emission-cleaning performance by simply using a three-way catalyst, without the need of a lean NOx catalyst, while maintaining the fuel economy improvement effect offered by lean burn operation.

SUMMARY OF THE INVENTION

It is an object of the invention to provide a control device for a spark-ignition engine which is based on the aforementioned prior art techniques but provides a further improvement in combustion performance.

According to the invention, a control device for a multicylinder spark-ignition engine of which individual cylinders undergo successive combustion cycles with specific phase delays, wherein the engine is switched depending on its operating conditions between normal operation mode, in which combustion is produced with the individual cylinders set to work independently of one another, and special operation mode, in which burned gas discharged from a preceding cylinder which is currently in an exhaust stroke is introduced directly into a following cylinder which is currently in an intake stroke. The control device includes a flow path switching unit and an air-fuel ratio control unit. The flow path switching unit switches intake and exhaust flow paths to form a two-cylinder interconnect configuration in the special operation mode such that the burned gas discharged from the preceding cylinder is introduced into the following cylinder through an intercylinder gas channel and an independent cylinder configuration in the normal operation mode such that fresh air is introduced into the individual cylinders. The air-fuel ratio control unit controls the air-fuel ratio in the individual cylinders in such a manner that combustion in the preceding cylinder is produced under lean mixture conditions at an air-fuel ratio larger than the stoichiometric air-fuel ratio by a specific amount by injecting fuel directly into the preceding cylinder and combustion in the following cylinder is produced at an air-fuel ratio approximately equal to the stoichiometric air-fuel ratio by supplying the fuel together with the burned gas of a lean mixture state discharged from the preceding cylinder in the special operation mode. The flow path switching unit switches the intake and exhaust flow paths to the independent cylinder configuration at engine startup to perform combustion control operation in the normal operation mode.

In this construction, the control device controls combustion in the special operation mode with the intake and exhaust flow paths set to the two-cylinder interconnect configuration in a low-speed, low-load range of the engine, for example. Consequently, combustion in the preceding cylinder is produced at a large air-fuel ratio (lean mixture) so that thermal efficiency is improved and pumping loss is reduced in the preceding cylinder resulting in a remarkable improvement in fuel economy, and combustion in the following cylinder is produced at an air-fuel ratio approximately equal to the stoichiometric air-fuel ratio by supplying the fuel to the burned gas of the lean mixture state (large air-fuel ratio) introduced from the preceding cylinder. It is therefore possible to achieve a fuel economy improvement effect at least due to the reduction in pumping loss. Furthermore, the amount of NOx generated in the preceding cylinder is kept to a relatively low level because combustion is produced at a significantly large air-fuel ratio. On the other hand, since the burned gas is introduced from the preceding cylinder into the following cylinder, a condition equivalent to what would occur when a great deal of exhaust gas is introduced by exhaust gas recirculation (EGR) is created in the following cylinder. As a result, NOx emission is sufficiently decreased in the following cylinder, providing an advantageous effect in improving the quality of emissions.

While high-temperature gas discharged from the preceding cylinder passes through the intercylinder gas channel, gas temperature is regulated by moderate heat dissipation along its length. Because this gas, in which the burned gas and excess air are mixed and dispersed uniformly, is introduced into the following cylinder, there is created an ideal condition for introduction of a great deal of EGR gas. In addition, since the fuel is injected into the gas at a relatively high temperature, evaporation of the fuel is accelerated and combustion in the following cylinder is performed in a desirable fashion. At engine startup, the flow path switching unit switches the intake and exhaust flow paths to form the independent cylinder configuration in which fresh air is introduced into the individual cylinders to perform the combustion control operation in the normal operation mode. This arrangement serves to effectively prevent engine misfire and ensure ease of engine startup.

In one aspect of the invention, the flow path switching unit includes a switching mechanism having an actuating member which shifts from a home position where the intake and exhaust flow paths are set to the independent cylinder configuration to an activated position where the intake and exhaust flow paths are set to the two-cylinder interconnect configuration and a biasing member for exerting a pushing force on the actuating member to return it to the home position, and a drive mechanism for causing the actuating member to shift to the activated position, wherein the actuating member is automatically returned to the home position due to the pushing force of the biasing member under normal conditions.

In this construction, the actuating member of the switching mechanism automatically returns to the home position due to the pushing force exerted by the biasing member when the engine stops, so that the intake and exhaust flow paths are switched to the independent cylinder configuration. Thus, fresh air is introduced into the individual cylinders at engine startup without the need to perform operation for actuating the switching mechanism by the aforementioned drive mechanism to shift the actuating member to the activated position by driving the switching mechanism with the drive mechanism. This serves to ensure ease of engine startup.

In another aspect of the invention, the preceding cylinder is provided with an intake port connected to an intake passage, a first exhaust port connected to an exhaust passage, a second exhaust port connected to the intercylinder gas channel, a first exhaust valve for opening and closing the first exhaust port and a second exhaust valve for opening and closing the second exhaust port, and the following cylinder is provided with a first intake port connected to the intake passage, a second intake port connected to the intercylinder gas channel, an exhaust port connected to the exhaust passage, a first intake valve for opening and closing the first intake port and a second intake valve for opening and closing the second intake port, wherein a switching mechanism for setting the intake and exhaust flow paths to the independent cylinder configuration by switching the first exhaust valve and the first intake valve to their closed state when an actuating member returns to the home position and by switching the second exhaust valve and the second intake valve to their activated state is provided in valve actuating mechanisms of the first and second exhaust valves and the first and second intake valves.

In this construction, the actuating member of the switching mechanism automatically returns to the home position due to the pushing force exerted by the biasing member when the engine stops. Consequently, the first exhaust valve provided in the first exhaust port is caused to open, the second exhaust valve provided in the second exhaust port is held in the closed state, the first intake valve provided in the first intake port is caused to open, and the second intake valve provided in the second intake port is held in the closed state. Therefore, the intake and exhaust flow paths can be switched to the independent cylinder configuration with a simple arrangement. Thus, fresh air is introduced into the individual cylinders at engine startup without the need to perform operation for actuating the switching mechanism by the aforementioned drive mechanism to shift the actuating member to the activated position by driving the switching mechanism with the drive mechanism. This serves to ensure ease of engine startup.

In another aspect of the invention, a first switching mechanism for switching the first exhaust valve and the first intake valve to their activated state when an actuating member returns to its home position is provided in a tappet portion for transmitting driving forces of cams to the first exhaust valve and the first intake valve, and a second switching mechanism for switching the second exhaust valve and the second intake valve to their closed state when an actuating member returns to its home position is provided in a tappet portion for transmitting driving forces of cams to the second exhaust valve and the second intake valve.

In this construction, the actuating members of the first and second switching mechanisms automatically return to their respective home positions due to the pushing force exerted by the biasing member when the engine stops. Consequently, the driving force of the cam is transmitted to the first exhaust valve provided in the first exhaust port of the preceding cylinder causing the first exhaust port to open and close, transmission of the driving force of the cam to the second exhaust valve provided in the second exhaust port is interrupted to hold the second exhaust valve in its closed state, the driving force of the cam is transmitted to the first intake valve provided in the first intake of the following cylinder causing the first intake valve to open, transmission of the driving force of the cam to the second intake valve provided in the second intake port is interrupted to hold the second intake valve in its closed state. Therefore, the intake and exhaust flow paths can be switched to the independent cylinder configuration with a simple arrangement. Thus, fresh air is introduced into the individual cylinders at engine startup without the need to perform operation for actuating the switching mechanism by the aforementioned drive mechanism to shift the actuating member to the activated position by driving the switching mechanism with the drive mechanism. This serves to ensure ease of engine startup.

In another aspect of the invention, switching mechanisms for switching the first exhaust valve and the first intake valve to their activated state and the second exhaust valve and the second intake valve to their closed state when actuating members return to their home positions are provided to rocker arms for transmitting driving forces of cams to the first and second exhaust valves and the first and second intake valves.

In this construction, the actuating members of the switching mechanisms provided to the rocker arms automatically return to their respective home positions due to the pushing force exerted by the biasing member when the engine stops. Consequently, the driving force of the cam is transmitted to the first exhaust valve provided in the first exhaust port of the preceding cylinder causing the first exhaust port to open and close, transmission of the driving force of the cam to the second exhaust valve provided in the second exhaust port is interrupted to hold the second exhaust valve in its closed state, the driving force of the cam is transmitted to the first intake valve provided in the first intake of the following cylinder causing the first intake valve to open, transmission of the driving force of the cam to the second intake valve provided in the second intake port is interrupted to hold the second intake valve in its closed state. Therefore, the intake and exhaust flow paths can be switched to the independent cylinder configuration with a simple arrangement. Thus, fresh air is introduced into the individual cylinders at engine startup without the need to perform operation for actuating the switching mechanism by the aforementioned drive mechanism to shift the actuating member to the activated position by driving the switching mechanism with the drive mechanism. This serves to ensure ease of engine startup.

In still another aspect of the invention, the preceding cylinder is provided with an intake port connected to an intake passage, a first exhaust port connected to an exhaust passage and a second exhaust port connected to the intercylinder gas channel, and the following cylinder is provided with a first intake port connected to the intake passage, a second intake port connected to the intercylinder gas channel and an exhaust port connected to the exhaust passage. The aforementioned flow path switching unit includes an intake on-off valve provided in a branched channel of the intake passage connected to the first intake port of the following cylinder, an exhaust on-off valve provided in a branched channel of the exhaust passage connected to the second exhaust port of the preceding cylinder, a gas channel on-off valve provided in the intercylinder gas channel, a biasing member for exerting a pushing force on the intake on-off valve and the exhaust on-off valve toward open positions which are their home positions under normal conditions, a biasing member for exerting a pushing force on the gas channel on-off valve toward a closed position which is its home position, a solenoid actuator for driving the intake on-off valve and the exhaust on-off valve toward closed positions which are their activated positions against the pushing forces exerted by the biasing members, and a solenoid actuator for driving the gas channel on-off valve toward an open position which is its activated position.

In this construction, the intake on-off valve, the exhaust on-off valve and the gas channel on-off valve automatically return to their respective home positions due to the pushing forces exerted by the biasing members when the engine stops. Consequently, the intake on-off valve and the exhaust on-off valve are caused to open and the gas channel on-off valve is caused to close. Therefore, the intake and exhaust flow paths can be switched to the independent cylinder configuration with a simple arrangement. Thus, fresh air is introduced into the individual cylinders at engine startup without the need to perform operation for actuating the switching mechanism by the aforementioned drive mechanism to shift the actuating member to the activated position by driving the switching mechanism with the drive mechanism. This serves to ensure ease of engine startup.

In yet another aspect of the invention, a three-way catalyst is provided in an exhaust passage, the preceding cylinder is provided with an intake port connected to an intake passage, a first exhaust port connected to the exhaust passage, a second exhaust port connected to the intercylinder gas channel, a first exhaust valve for opening and closing the first exhaust port and a second exhaust valve for opening and closing the second exhaust port, and the following cylinder is provided with a first intake port connected to the intake passage, a second intake port connected to the intercylinder gas channel, an exhaust port connected to the exhaust passage, a first intake valve for opening and closing the first intake port and a second intake valve for opening and closing the second intake port. The aforementioned flow path switching unit includes a switching mechanism having an actuating member which shifts from a home position where the intake and exhaust flow paths are set to the independent cylinder configuration with the first exhaust valve and the first intake valve set to their activated state to an activated position where the intake and exhaust flow paths are set to the two-cylinder interconnect configuration with the first exhaust valve and the first intake valve set to their closed state, and a biasing member for exerting a pushing force on the actuating member to return it to the home position, and a drive mechanism for causing the actuating member to shift to the activated position. The flow path switching unit switches the intake and exhaust flow paths to the independent cylinder configuration by causing the actuating member to automatically return to the home position due to the pushing force of the biasing member at engine startup to perform the combustion control operation in the normal operation mode.

While high-temperature gas discharged from the preceding cylinder passes through the intercylinder gas channel, gas temperature is regulated by moderate heat dissipation along its length. Because this gas, in which the burned gas and excess air are mixed and dispersed uniformly, is introduced into the following cylinder, there is created an ideal condition for introduction of a great deal of EGR gas. In addition, since only the burned gas having an air-fuel ratio approximately equal to the stoichiometric air-fuel ratio discharged from the preceding cylinder is led to the exhaust passage provided with the three-way catalyst, sufficient emission-cleaning performance is ensured with the three-way catalyst alone.

In this construction, the actuating member of the switching mechanism automatically returns to the home position due to the pushing force exerted by the biasing member when the engine stops. Consequently, the first exhaust valve provided in the first exhaust port is caused to open, the second exhaust valve provided in the second exhaust port is held in the closed state, the first intake valve provided in the first intake port is caused to open and close, and the second intake valve provided in the second intake port is held in the closed state. Therefore, the intake and exhaust flow paths can be switched to the independent cylinder configuration with a simple arrangement. Thus, fresh air is introduced into the individual cylinders at engine startup without the need to perform operation for actuating the switching mechanism by the aforementioned drive mechanism to shift the actuating member to the activated position by driving the switching mechanism with the drive mechanism. This serves to ensure ease of engine startup.

Overall, the invention makes it possible to smoothly start the engine by producing uninterrupted combustion in the individual cylinders while preventing misfire which could occur due to introduction of a large amount of burned gas into the following cylinder. In addition, the invention makes it unnecessary to provide an expensive, high-capacity NOx catalyst in the exhaust passage and provides such advantageous effects that sufficient engine output performance is obtained under varying engine operating conditions and an improvement in fuel economy is achieved while ensuring high emission-cleaning performance with a simple construction.

These and other objects, features and advantages of the invention will become more apparent upon reading the following detailed description along with the accompanying drawings.

BRIEF DESCRIPTION OF THE DRAWINGS

FIG. 5 is a perspective view showing the specific construction of a center tappet and a side tappet;

DETAILED DESCRIPTION OF THE PREFERRED EMBODIMENTS OF THE INVENTION

Figure 1:
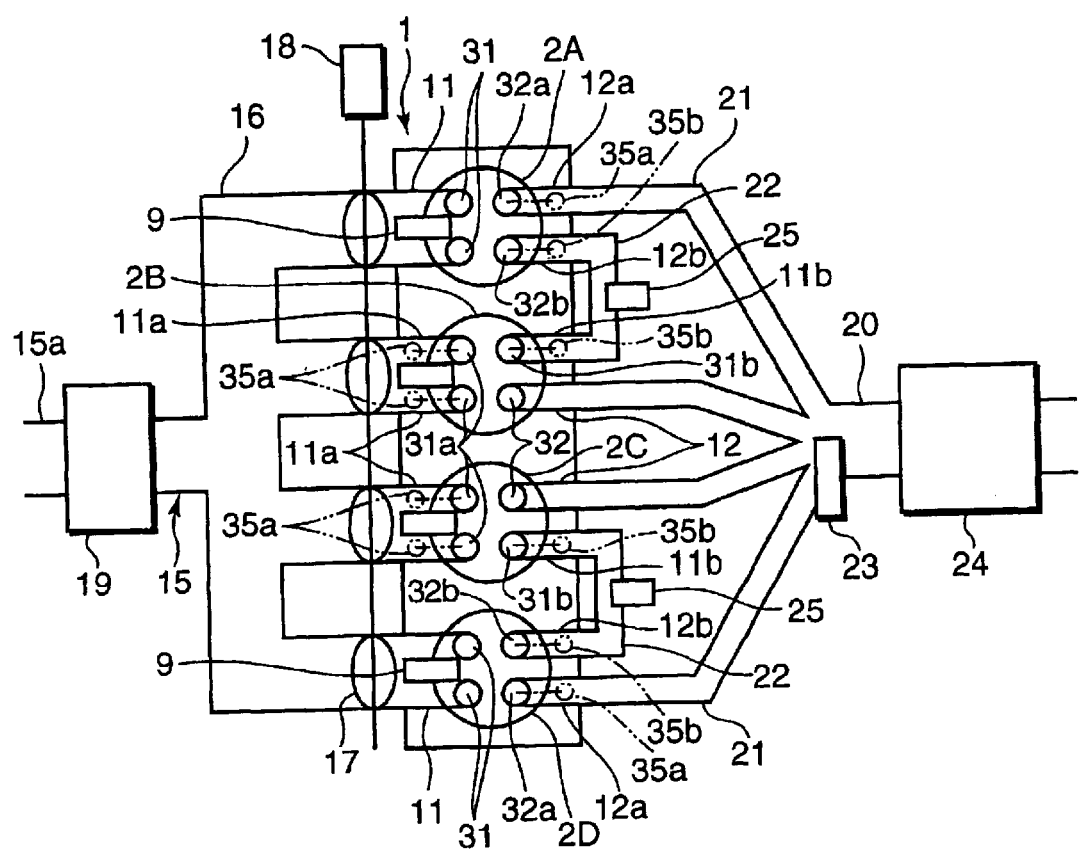
FIG. 1 is a schematic plan view of an entire engine provided with a control device according to an embodiment of the invention.
Figure 2:
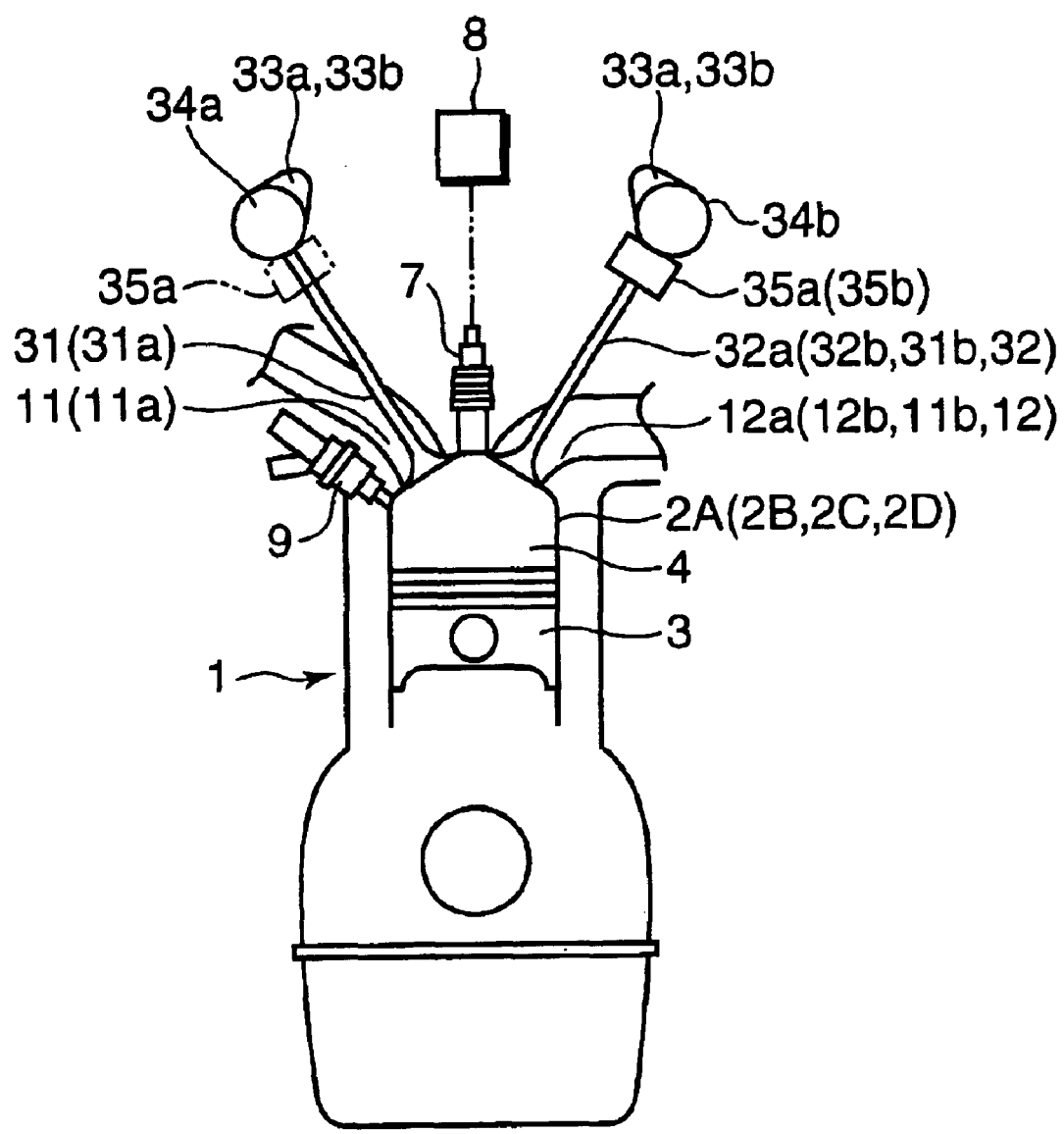
FIG. 2 is a schematic sectional view of an engine body and associated elements.

FIG. 1 is a diagram schematically showing the construction of a four-cylinder engine provided with a control device according to an embodiment of the invention, and FIG. 2 is a diagram generally showing the construction of one cylinder of an engine body, intake and exhaust valves provided in the cylinder, etc. Referring to these Figures, the engine body 1 has a plurality of cylinders. Specifically, it has four cylinders designated 2A to 2D in the illustrated embodiment, with one each piston 3 fitted in the individual cylinders 2A–2D and a combustion chamber 4 formed above the piston 3.

There is provided a spark plug 7 at the top of the combustion chamber 4 in each cylinder 2 in such a way that a far end of the spark plug 7 is located inside the combustion chamber 4. The spark plug 7 is connected to an ignition circuit 8 which permits electronic control of ignition timing.

On one side of the combustion chamber 4 of each cylinder 2, there is provided a fuel injector 9 for injecting fuel directly into the combustion chamber 4. The fuel injector 9 incorporates a needle valve and a solenoid which are not illustrated. Actuated by a later-described pulse signal input, the fuel injector 9 causes its needle valve to open at pulse input timing during a period corresponding to the pulselength of the pulse signal and injects a specific amount of fuel determined by the valve open period. Although not illustrated, the fuel is supplied from a fuel pump to the fuel injector 9 through a fuel-feeding passage. A fuel-feeding system is so constructed to provide a fuel pressure higher than the internal pressure of the combustion chamber 4 in each compression stroke.

Intake ports 11, 11a, 11b and exhaust ports 12, 12a, 12b open to the combustion chambers 4 of the individual cylinders 2A–2D. Intake channels 16 branched from an intake passage 15 and exhaust channels 21 branched from a common exhaust passage 20 are connected to these ports 11, 11a, 11b, 12, 12a, 12b which are opened and closed by intake valves 31, 31a, 31b and exhaust valves 32, 32a, 32b, respectively.

Figure 10:
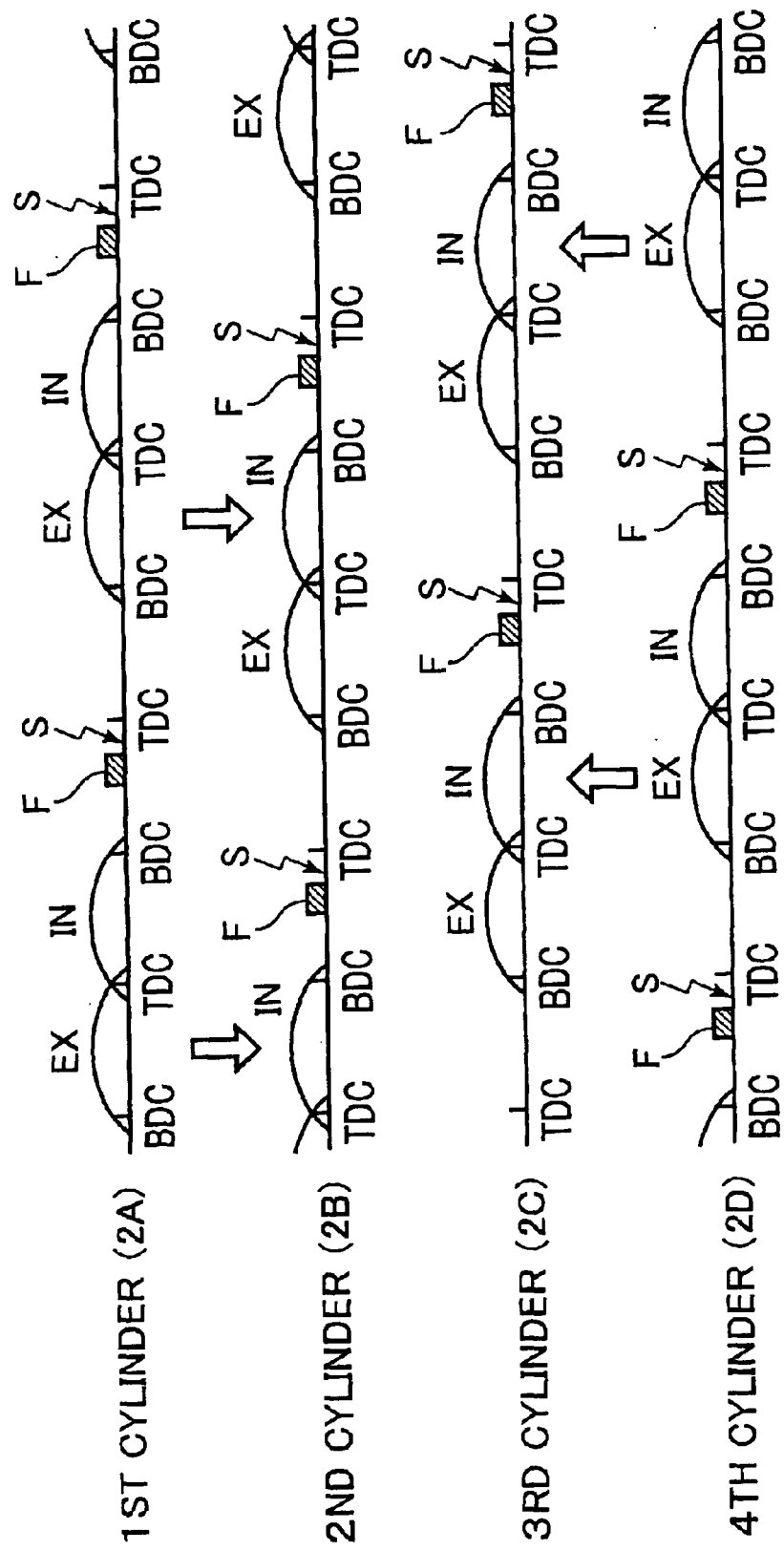
FIG. 10 is a diagram showing the timing of exhaust and intake strokes as well as the timing of fuel injection and ignition of individual cylinders.

The individual cylinders 2A–2D undergo successive combustion cycles of intake, compression, expansion and exhaust strokes with specific phase delays. In this four-cylinder engine of which cylinders 2A–2D are hereinafter referred to as the first cylinder 2A, the second cylinder 2B, the third cylinder 2C and the fourth cylinder 2D as viewed from one end of the cylinder bank, the combustion cycles are carried out in the order of the first cylinder 2A, the third cylinder 2C, the fourth cylinder 2D and the second cylinder 2B with a successive phase delay of 180° as shown in FIG. 10, in which "EX" designates the exhaust stroke, "IN" designates the intake stroke, "F" designates fuel injection and "S" designates ignition.

There is provided an intercylinder gas channel 22 between two cylinders of which exhaust and intake strokes overlap so that already burned gas can be led from the cylinder in the exhaust stroke (hereinafter referred to as the preceding cylinder in this Specification) to the cylinder in the intake stroke (hereinafter referred to as the following cylinder in this Specification) during a period of overlap of the exhaust and intake strokes. In this four-cylinder engine of the embodiment, the exhaust stroke (EX) of the first cylinder 2A overlaps the intake stroke (IN) of the second cylinder 2B and the exhaust stroke (EX) of the fourth cylinder 2D overlaps the intake stroke (IN) of the third cylinder 2C as shown in FIG. 10. Thus, the first cylinder 2A and the second cylinder 2B constitute one cylinder pair and the fourth cylinder 2D and the third cylinder 2C constitute another cylinder pair, the first and fourth cylinders 2A, 2D serving as the preceding cylinders and the second and third cylinders 2B, 2C serving as the following cylinders.

The first and fourth cylinders 2A, 2D serving as the preceding cylinders are provided with respective pairs of intake ports 11 for introducing fresh air taken in through the intake passage 15, the first exhaust ports 12a for letting out the burned gas (exhaust gas) into the exhaust passage 20, and the second exhaust ports 12bs for delivering the burned gas to the second and third cylinders 2B, 2C serving as the following cylinders, respectively.

The second and third cylinders 2B, 2C serving as the following cylinders are provided with respective pairs of first intake ports 11a for introducing fresh air taken in through the intake passage 15, the second intake port 11b for introducing the burned gas from the first and fourth cylinders 2A, 2D serving as the preceding cylinders, and the exhaust ports 12 for letting out the burned gas into the exhaust passage 20, respectively.

In the example shown in FIG. 1, two each intake ports 11 are provided in the first and fourth cylinders 2A, 2D which serve as the preceding cylinders, and two each first intake ports 11a are provided in the second and third cylinders 2B, 2C which serve as the following cylinders in parallel arrangement on left half sides of the respective combustion chambers 4 as illustrated. Also, one each first exhaust port 12a and second exhaust port 12b are provided in the first and fourth cylinders 2A, 2D, and one each second intake port 11b and exhaust port 12 are provided in the second and third cylinders 2B, 2C in parallel arrangement on right half sides of the respective combustion chambers 4 as illustrated.

Downstream ends of the individual intake channels 16 branching out from the intake passage 15 are connected to the intake ports 11 of the first and fourth cylinders (preceding cylinders) 2A, 2D or to the first intake ports 11a of the second and third cylinders (following cylinders) 2B, 2C. Close to the downstream ends of the individual branched intake channels 16, there are provided multiple throttle valves 17 which are interlocked by a common shaft. The multiple throttle valves 17 are driven by an actuator 18 to regulate the amount of intake air. An airflow sensor 19 for detecting the amount of intake air is provided in a common intake passage 15a which is located upstream of a branching point of the intake passage 15.

Upstream ends of the individual exhaust channels 21 branching from the exhaust passage 20 are connected to the first exhaust ports 12a of the first and fourth cylinders (preceding cylinders) 2A, 2D or to the exhaust ports 12 of the second and third cylinders (following cylinders) 2B, 2C. The intercylinder gas channels 22 are provided between the first cylinder 2A and the second cylinder 2B and between the third cylinder 2C and the fourth cylinder 2D. Upstream ends of the intercylinder gas channels 22 are connected to the second exhaust ports 12b of the first and fourth cylinders 2A, 2D which serve as the preceding cylinders, and downstream ends of the intercylinder gas channels 22 are connected to the second intake ports 11b of the second and third cylinders 2B, 2C which serve as the following cylinders.

An $O_2$ sensor 23 serving as an exhaust gas concentration sensor for detecting the stoichiometric air-fuel ratio is provided at a branching point of the exhaust passage 20, at downstream ends of the individual branched exhaust channels 21, and a three-way catalyst 24 for cleaning emissions is provided in the exhaust passage 20 further downstream of the $O_2$ sensor 23. As is commonly known, the three-way catalyst 24 is a catalyst which exhibits high converting performance with respect to HC, CO and NOx when the air-fuel ratio of the exhaust gas is approximately equal to the stoichiometric air-fuel ratio (i.e., excess-air factor $\lambda=1$). Provided for detecting the air-fuel ratio by measuring the concentration of oxygen in the exhaust gas, the aforementioned $O_2$ sensor 23 is formed of a $\lambda O_2$ sensor of which output suddenly changes particularly at about the stoichiometric air-fuel ratio.

A linear $O_2$ sensor 25 (serving as an exhaust gas concentration sensor for detecting a "lean mixture" air-fuel ratio) of which output linearly varies with changes in oxygen concentration in the exhaust gas is provided in each of the aforementioned intercylinder gas channels 22.

The intake and exhaust valves for opening and closing the aforementioned intake and exhaust ports of the individual cylinders 2A–2D and valve actuating mechanisms for controlling them are constructed as follows.

The intake ports 11, the first exhaust ports 12a and the second exhaust ports 12b of the first and fourth cylinders (preceding cylinders) 2A, 2D are provided with the intake valves 31, the first exhaust valves 32a and the second exhaust valves 32b, respectively. Similarly, the first intake ports 11a, the second intake ports 11b and the exhaust ports 12 of the second and third cylinders (following cylinders) 2B, 2C are provided with the first intake valves 31a, the second intake valves 31b and the exhaust valves 32, respectively.

The aforementioned valve actuating mechanisms which include camshafts 34a, 34b drive these intake and exhaust valves to open and close them with specific timing such that the exhaust and intake strokes of the individual cylinders 2A–2D are performed with the specific phase delays mentioned above. Each of the camshafts 34a, 34b is provided with a first cam 33a for opening and closing the intake or exhaust valve by lifting it and a pair of second cams 33b for retaining the intake or exhaust valve in their closed state by preventing it from being lifted.

Among the aforementioned intake and exhaust valves, the first exhaust valves 32a of the preceding cylinders 2A, 2D and the first intake valves 31a of the following cylinders 2B, 2C are individually provided with first switching mechanisms 35a for switching the respective valves from their activated state to their closed state. Also, the second exhaust valves 32b of the preceding cylinders 2A, 2D and the second intake valves 31b of the following cylinders 2B, 2C are individually provided with second switching mechanisms 35b for switching the respective valves from their closed state to their activated state.

Figure 3:
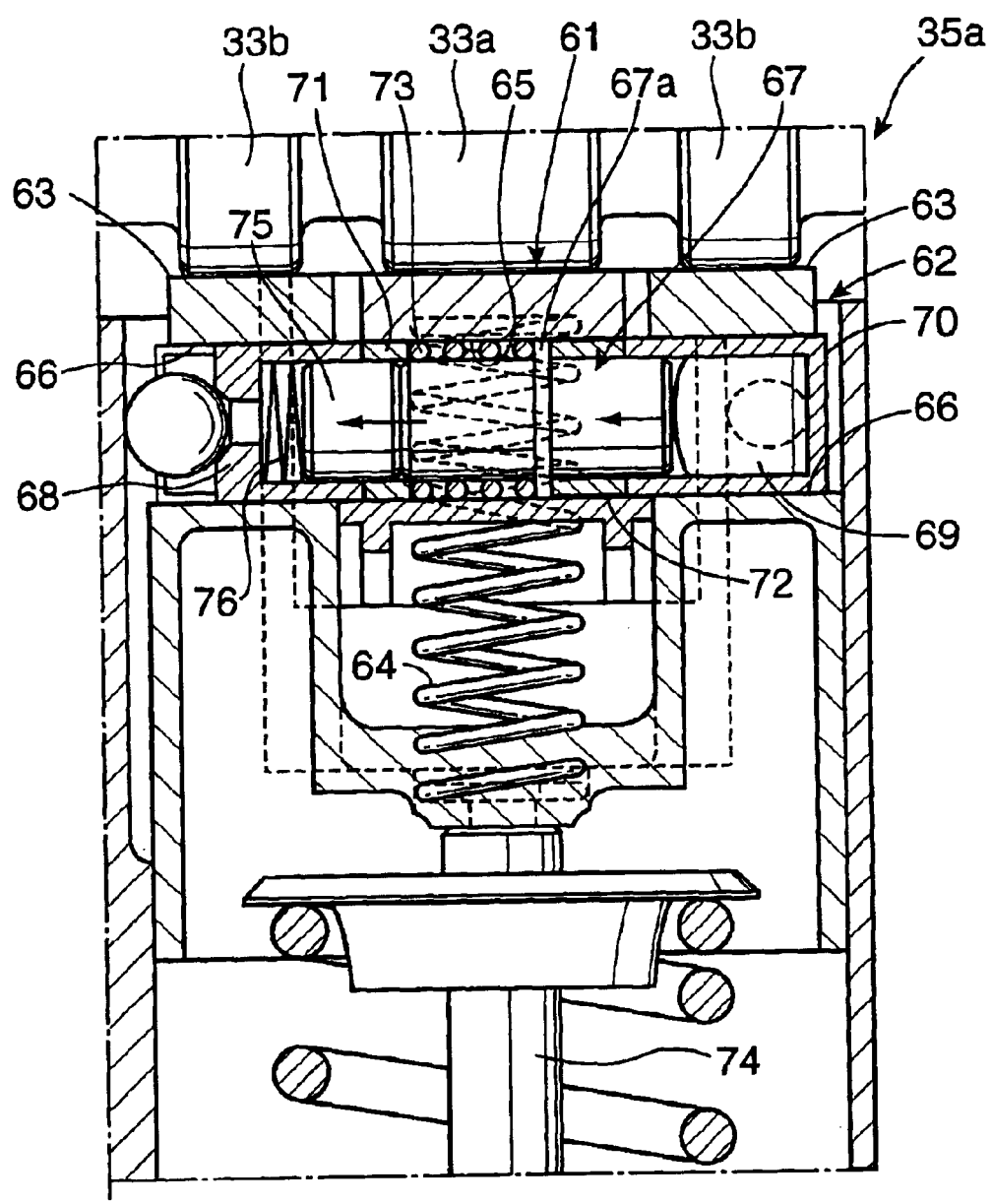
FIG. 3 is a sectional front view showing a specific construction of a first switching mechanism.
Figure 4:
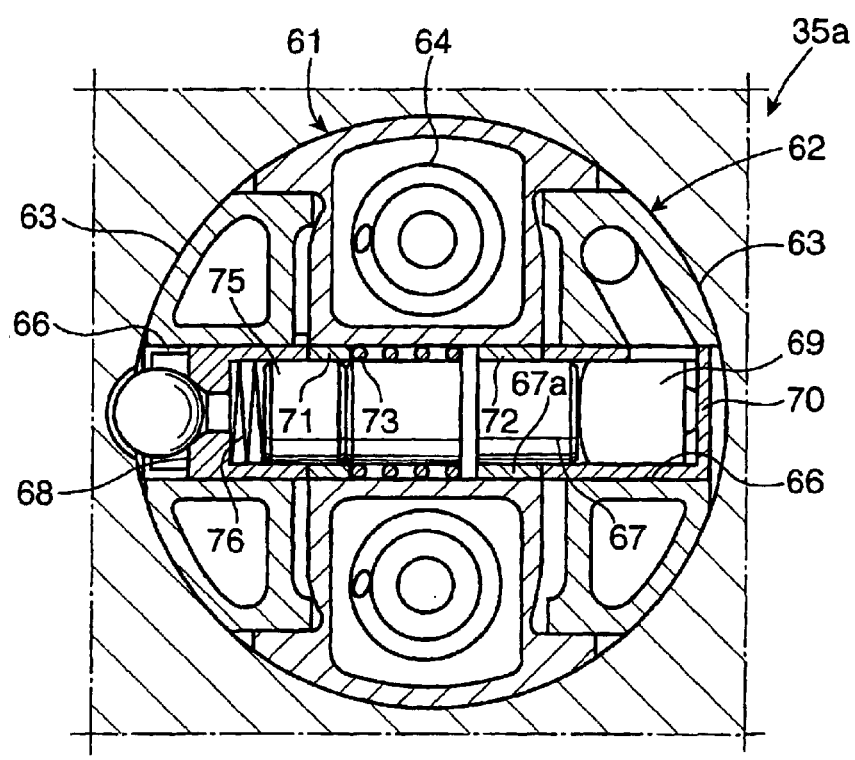
FIG. 4 is a sectional plan view showing the specific construction of the first switching mechanism.

As shown in FIGS. 3–5, each first switching mechanism 35a includes a center tappet 61 provided at a position corresponding to the first cam 33a of the valve actuating mechanism, a side tappet 62 having a pair of projecting parts 63 located at positions corresponding to the second cams 32b, and a pair of compression coil springs 64 located between the bottom of the side tappet 62 and the bottom surface of the center tappet 61 for pushing the center tappet 61 in a direction to keep its top surface in tight contact with the first cam 33a.

In the center tappet 61 and the two projecting parts 63 of the side tappet 62, there are formed lock holes 65, 66 at corresponding positions so that these lock holes 65, 66 align to form a single through hole when the center tappet 61 is in its upper position shown in FIG. 3. A lock pin 67 having a flange portion 67a is fitted slidably in its axial direction in the lock hole 65 of the center tappet 61. A first holder 68 having a cavity for accommodating a first plunger 75 and a biasing member 76 formed of a compression coil spring for forcing the first plunger 75 against the lock pin 67 is fitted in the lock hole 66 formed in one of the projecting parts 63 of the side tappet 62, while a second holder 70 for accommodating a second plunger 69 is fitted in the lock hole 66 formed in the other projecting part 63.

First and second bushes 71, 72 for holding both ends of the lock pin 67 and a biasing member 73 formed of a compression coil spring for forcing the lock pin 67 in the direction of its root end (toward the second plunger 69) are fitted in the lock hole 65 of the center tappet 61. Under normal conditions, the flange portion 67*a* of the lock pin 67 is supported at its home position where the flange portion 67*a* is in contact with a far end of the second bush 72 due to pushing forces of the biasing members 73, 76 as shown in FIGS. 3 and 4, so that the lock pin 67 is accommodated bridging a gap between the lock hole 65 of the center tappet 61 and the second holder 70, and the first plunger 75 is accommodated bridging the first holder 68 and the first bush 71, whereby the center tappet 61 and the side tappet 62 are held in an interlocked condition. As a result, a driving force of the center tappet 61 which is activated by the first cam 33*a* is transmitted to stem ends 74 of the first exhaust valve 32*a* and the first intake valve 31*a* via the side tappet 62, thereby causing the first exhaust valve 32*a* and the first intake valve 31*a* to open and close.

When hydraulic oil is supplied through a later-described passage 36 for supplying and drawing the hydraulic oil into a space between a root end of the second plunger 69 and the bottom of the second holder 70, the lock pin 67 forced toward the first plunger 75 moves in a direction of an arrow shown in FIG. 3 up to an activated position where the lock pin 67 is accommodated in the lock hole 65 of the center tappet 61 against the pushing force of the biasing member 73. Also, the first plunger 75 forced toward the first holder 68 moves in a direction of an arrow shown in FIG. 3 up to an activated position where first plunger 75 is accommodated in the first holder 68 overwhelming the pushing force of the biasing member 76. Consequently, the center tappet 61 is disengaged from the side tappet 62. As a result, transmission of a driving force of the first cam 33*a* to the stem ends 74 of the first exhaust valve 32*a* and the first intake valve 31*a* via the side tappet 62 is interrupted, so that the first exhaust valve 32*a* and the first intake valve 31*a* are held in their closed state.

Figure 6:
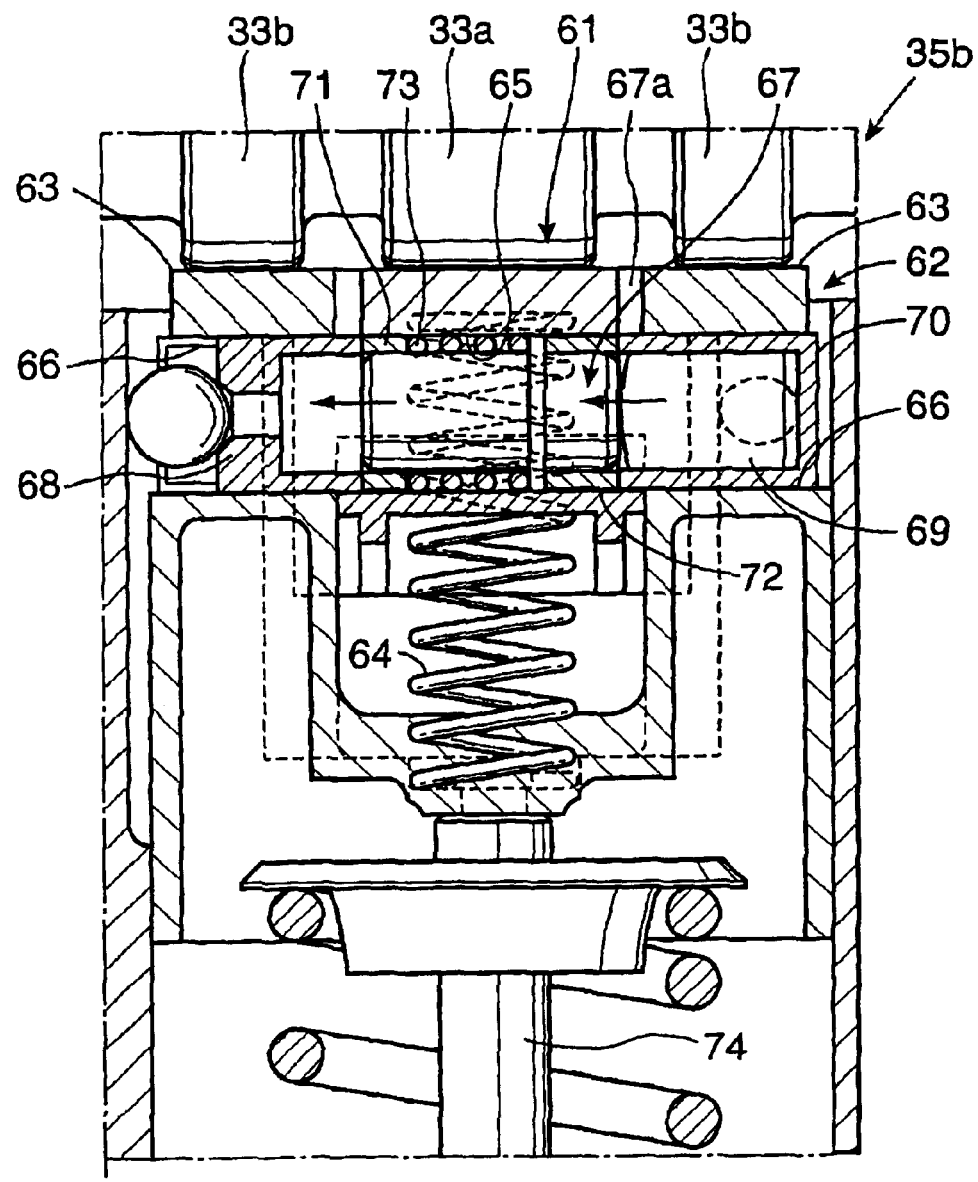
FIG. 6 is a sectional front view showing a specific construction of a second switching mechanism.

On the other hand, the second switching mechanism 35*b* for driving the second exhaust valve 32*b* and the second intake valve 31*b* is constructed in the same way as the first switching mechanism 35*a* except that the center tappet 61 is disengaged from the side tappet 62 under normal conditions with the lock pin 67 accommodated in the lock hole 65 of the center tappet 61 and the second plunger 69 held at its home position where it is accommodated in the second holder 70, as shown in FIG. 6.

Under normal conditions, the supply of the hydraulic oil to the second switching mechanism 35*b* is interrupted so that the second exhaust valve 32*b* and the second intake valve 31*b* are held in their closed state. Also, as the hydraulic oil is supplied through the passage 36 for supplying and drawing the hydraulic oil to the space between the root end of the second plunger 69 and the bottom of the second holder 70, a far end of the second plunger 69 goes into the lock hole 65 of the center tappet 61, and the lock pin 67 forced by the second plunger 69 is pushed toward the first holder 68 against the pushing force of the biasing member 73 and moves up to the activated position where a far end of the lock pin 67 is located within the first holder 68 as shown by an arrow in FIG. 6. Consequently, the center tappet 61 and the side tappet 62 are engaged with each other. As a result, the driving force of the first cam 33*a* is transmitted to the stem ends 74 of the second exhaust valve 32*b* and the second intake valve 31*b* via the side tappet 62, whereby the second exhaust valve 32*b* and the second intake valve 31*b* are caused to open and close.

Figure 7:
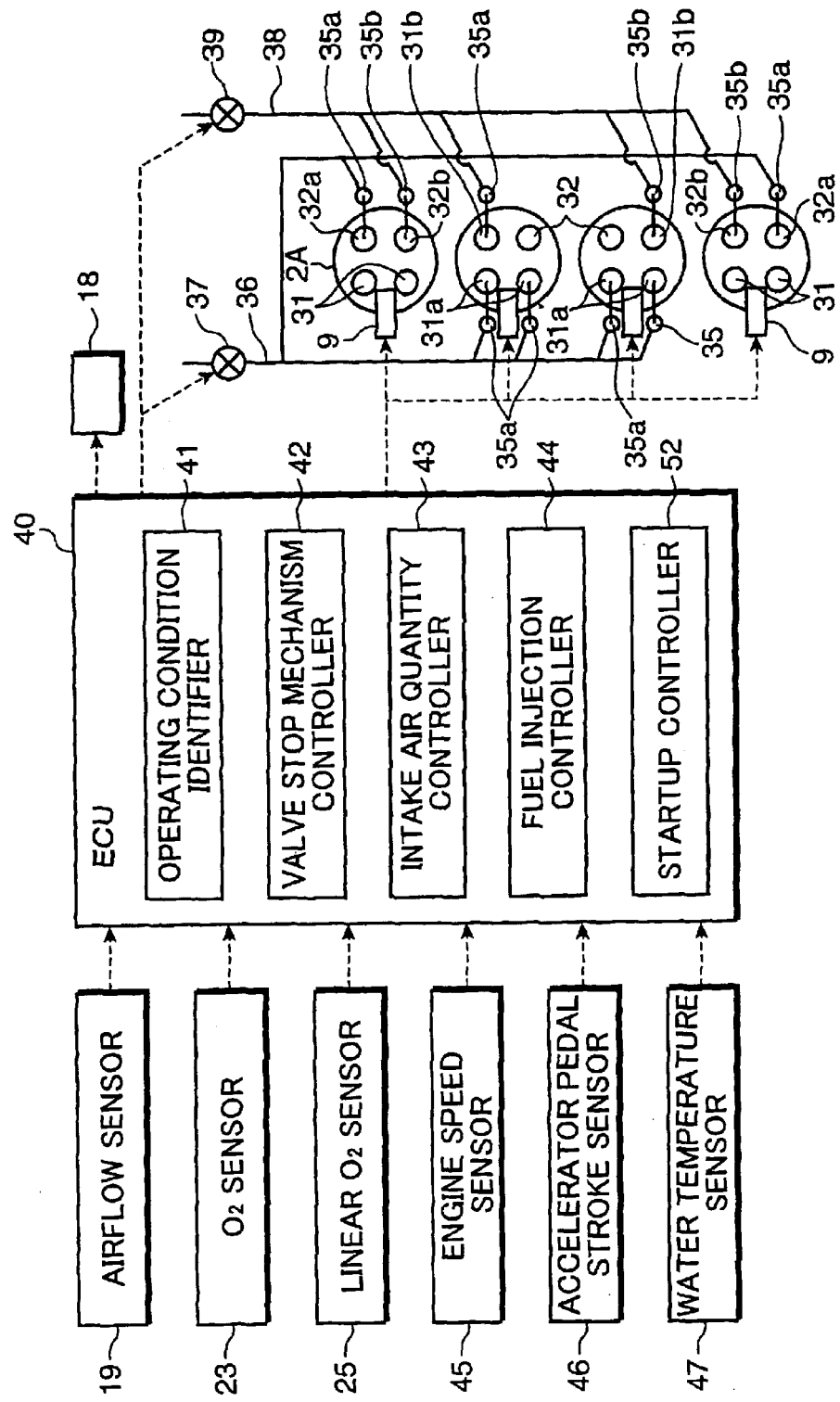
FIG. 7 is a block diagram of a control system.

As shown in FIG. 7, a first control valve 37 is provided in the passage 36 for supplying and drawing the hydraulic oil to and from the first switching mechanisms 35*a* of the first exhaust valves 32*a* and those of the first intake valves 31*a*, while a second control valve 39 is provided in a passage 38 for supplying and drawing the hydraulic oil to and from the second switching mechanisms 35*b* of the second exhaust valves 32*b* and those of the second intake valves 31*b*.

FIG. 7 shows the configuration of a drive/control system of the engine. As shown in this Figure, signals output from the airflow sensor 19, the $O_2$ sensor 23 and the linear $O_2$ sensors 25 are input to an ECU (electronic control unit) 40 including a microcomputer for controlling the engine. Also input to the ECU 40 are signals from an engine speed sensor 45 for detecting engine speed for judging operating condition of the engine, an accelerator pedal stroke sensor 46 for detecting throttle opening (the amount of depression of an accelerator) and a water temperature sensor 47 for detecting the temperature of engine cooling water. On the other hand, the ECU 40 outputs control signals to the individual fuel injectors 9, the actuator 18 of the multiple throttle valves 17 as well as to the first and second control valves 37, 39.

The ECU 40 includes an operating condition identifier 41 for judging the operating conditions of the engine, a valve stop mechanism controller 42 for controlling the first and second switching mechanisms 35*a*, 35*b*, an intake air quantity controller 43 for controlling the amount of intake air introduced into the combustion chambers 4 of the engine, a fuel injection controller 44 for controlling fuel injecting conditions, and a startup controller 52 for performing a later-described startup control operation at engine startup.

Figure 8:
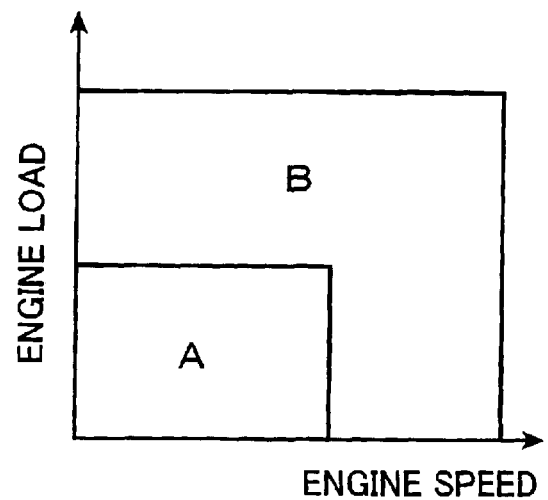
FIG. 8 is an explanatory diagram showing engine operating ranges.

The operating condition identifier 41 judges the operating conditions of the engine based on the signals concerning the engine speed and load fed from the engine speed sensor 45 and the accelerator pedal stroke sensor 46, for example. When the engine in an operating range A on a low-load, low-speed side shown in FIG. 8, the ECU 40 controls the operation of the engine in special operation mode in a later-described two-cylinder interconnect configuration. When the engine in an operating range B on a high-load or high-speed side shown in FIG. 8, on the other hand, the ECU 40 controls combustion in normal operation mode in a later-described independent cylinder configuration.

The valve stop mechanism controller 42 drives the first and second switching mechanisms 35*a*, 35*b* by controllably opening and closing the individual control valves 37, 39 to switch intake and exhaust flow paths between the two-cylinder interconnect configuration and the independent cylinder configuration depending on whether the engine is currently in the operating range A or B as judged by the operating condition identifier 41. A drive mechanism provided with the first and second control valves 37, 39 which are caused to open and close by the valve stop mechanism controller 42 and the first and second switching mechanisms 35*a*, 35*b* together constitute a flow path switching unit for switching the intake and exhaust flow paths between the two-cylinder interconnect configuration and the independent cylinder configuration.

Figure 9:
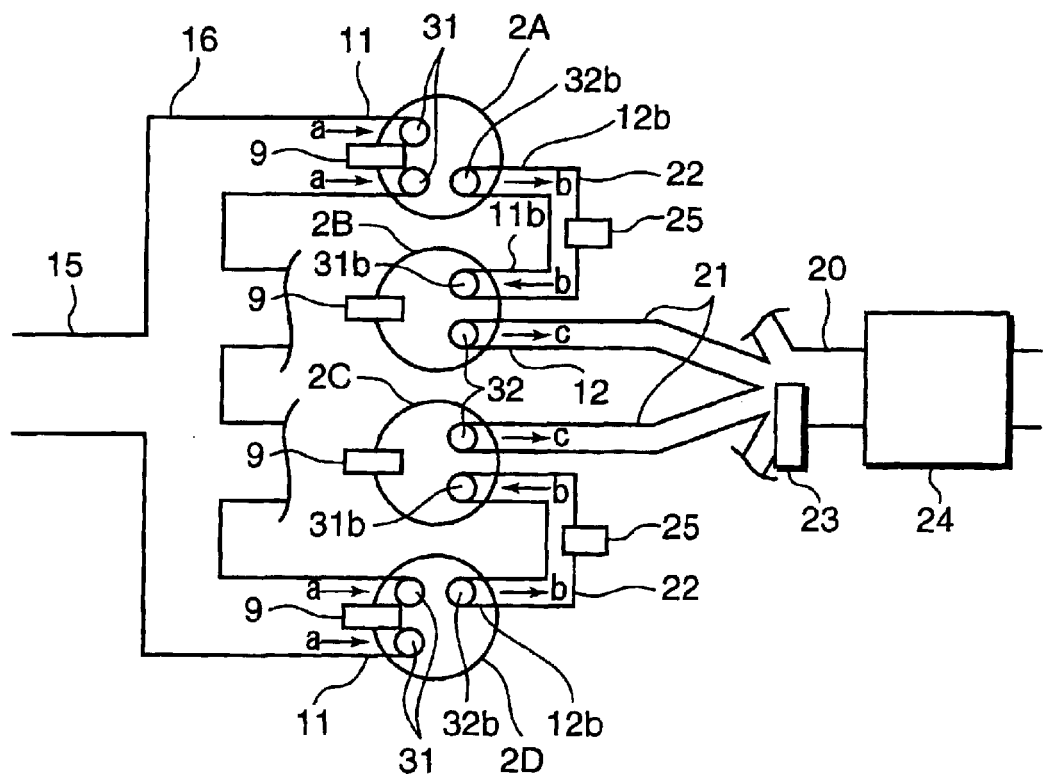
FIG. 9 is an explanatory diagram showing substantial intake and exhaust flow paths formed in an operating range on a low-load, low-speed side.

Specifically, when the engine is in the operating range A on the low-load, low-speed side, the hydraulic oil is supplied to the first and second switching mechanisms 35*a*, 35*b* with the control valves 37, 39 held in their closed state. As a result, transmission of driving forces to the first intake valves 31*a* and the first exhaust valves 32*a* is interrupted and these valves 31*a*, 32*a* are held in the closed state, while transmission of driving forces to the second intake valves 31*b* and the second exhaust valves 32*b* is enabled and these valves 31*b*, 32*b* are caused to open and close. Consequently, the intake and exhaust flow paths are set to form the two-cylinder interconnect configuration as shown in FIG. 9.

Figure 11:
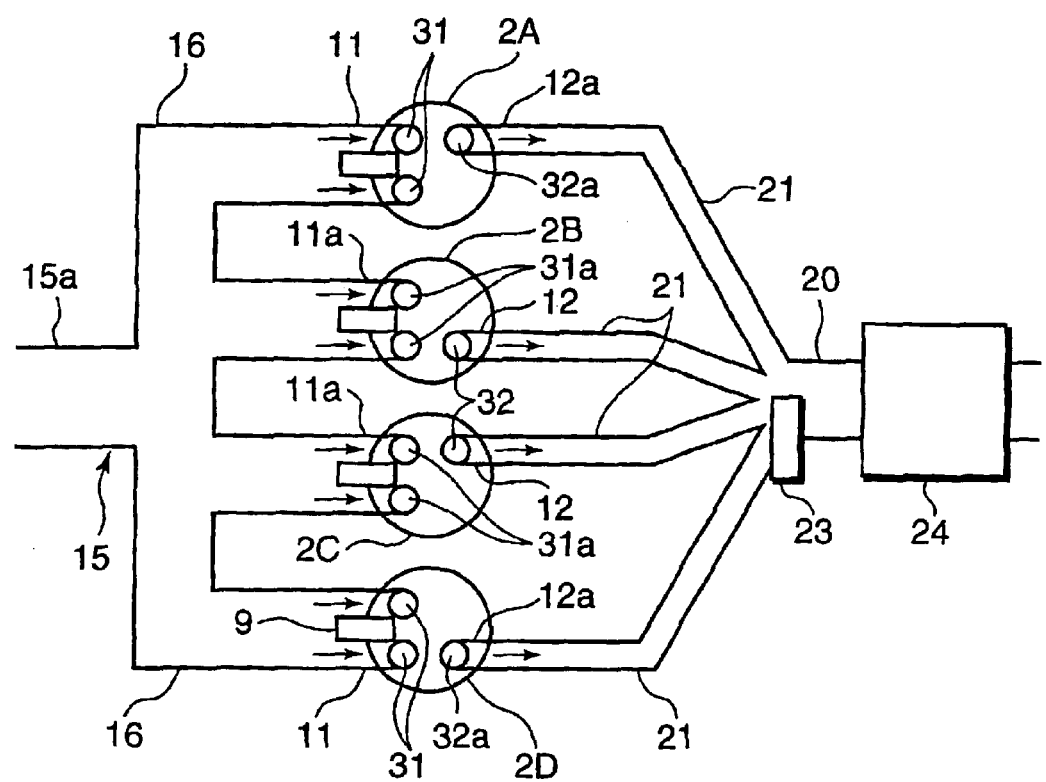
FIG. 11 is an explanatory diagram showing substantial intake and exhaust flow paths formed in an operating range on a high-load or high-speed side.

On the other hand, when the engine is in the operating range B on the high-load or high-speed side, the supply of the hydraulic oil to the first and second switching mechanisms 35a, 35b is interrupted with the control valves 37, 39 held in their closed state. As a result, transmission of the driving forces to the first intake valves 31a and the first exhaust valves 32a is enabled and these valves 31a, 32a are caused to open and close, while transmission of the driving forces to the second intake valves 31b and the second exhaust valves 32b is interrupted and these valves 31b, 32b are held in the closed state. Consequently, the intake and exhaust flow paths are set to form the independent cylinder configuration as shown in FIG. 11.

The intake air quantity controller 43 controls the opening of each throttle valve 17 (throttle opening) by controlling the actuator 18. The intake air quantity controller 43 determines a target intake air quantity from a map, for example, based on the engine operating condition and controls the throttle opening according to the target intake air quantity obtained. In the low-load, low-speed operating range A, the ECU 40 performs control operation in the special operation mode in which the intake air quantity controller 43 regulates the throttle opening in such a manner that air as much as necessary for combustion of fuel to be supplied a pair of preceding and following cylinders is supplied to each of the preceding cylinders (first and fourth cylinders 2A, 2D). Under these conditions, excess air contained in the gas introduced from the preceding cylinders (first and fourth cylinders 2A, 2D) is used for combustion with introduction of intake air into the following cylinders (second and third cylinders 2B, 2C) through the branched intake channels 16 interrupted in the low-load, low-speed operating range A as will be later described in detail.

The aforementioned fuel injection controller 44 controls the amounts of fuel to be injected from the fuel injectors 9 of the individual cylinders 2A–2D and injection timing according to the engine operating condition. In particular, the fuel injection controller 44 selectively sets conditions of fuel injection control operation suited for the special operation mode in which the engine is in the operating range A and the normal operation mode in which the engine is in the operating range B. The intake air quantity controller 43 and the fuel injection controller 44 together constitute an air-fuel ratio control unit.

Specifically, in the special operation mode in which the engine operating condition falls in the operating range A on the low-load, low-speed side, the fuel injection controller 44 controls the amounts of fuel injected into the preceding cylinders (first and fourth cylinders 2A, 2D) in such a manner that the air-fuel ratio becomes significantly larger than the stoichiometric air-fuel ratio, e.g., approximately equal to twice the stoichiometric air-fuel ratio or larger, to create a lean mixture, and sets injection timing to inject the fuel during the compression stroke to thereby produce stratified charge combustion in the preceding cylinders 2A, 2D. On the other hand, the fuel injection controller 44 controls the amounts of fuel injected into the following cylinders (second and third cylinders 2B, 2C) to obtain the stoichiometric air-fuel ratio therein by feeding the fuel into burned gas of a "lean mixture" air-fuel ratio introduced from the preceding cylinders 2A, 2D, and sets injection timing to enable ignition and combustion in an atmosphere rich in burned gas. As an example, the fuel is injected during the compression stroke to ensure ignitability.

The aforementioned operation for controlling the amounts of injected fuel is performed by feedback control based on the outputs from the airflow sensor 19, the $O_2$ sensor 23, etc. Specifically, a basic fuel injection quantity is so calculated for each cylinder based on the amount of intake air detected by the airflow sensor 19 as to produce a specific "lean mixture" air-fuel ratio in the preceding cylinders 2A, 2D and the stoichiometric air-fuel ratio in the following cylinders 2B, 2C. The amounts of fuel injected into the preceding cylinders 2A, 2D are corrected by feedback based on the outputs from the linear $O_2$ sensors 25 provided in the intercylinder gas channels 22, and the amounts of fuel injected into the following cylinders 2B, 2C are corrected by feedback based on the output from the $O_2$ sensor 23 provided in the exhaust passage 20.

In the normal operation mode in which the engine operating condition falls in the operating range B on the high-load or high-speed side, on the other hand, the amounts of injected fuel are so controlled as to produce an air-fuel ratio equal to or larger than the stoichiometric air-fuel ratio in the individual cylinders 2A–2D. For example, the air-fuel ratio is made equal to the stoichiometric air-fuel ratio in most regions of the operating range B and made lower than the stoichiometric air-fuel ratio to produce a rich mixture at and around a full-throttle load region. In this engine operating condition, the injection timing is so set as to produce uniform charge combustion by injecting the fuel in the intake stroke into the individual cylinders 2A–2D.

The startup controller 52 starts up the engine under conditions in which the intake and exhaust flow paths are set to the independent cylinder configuration by the flow path switching unit including the first and second switching mechanisms 35a, 35b and, after engine startup, performs combustion control operation in the special operation mode with the intake and exhaust flow paths set to the two-cylinder interconnect configuration by the flow path switching unit.

The working of the aforementioned control device of the present embodiment is now described with reference to FIGS. 9–11.

In the special operation mode performed in the operating range A on the low-load, low-speed side except at engine startup, the hydraulic oil is supplied to the first and second switching mechanisms 35a, 35b with the control valves 37, 39 held in their closed state as stated earlier, so that the first intake valves 31a and the first exhaust valves 32a are held in the closed state and the second intake valves 31b and the second exhaust valves 32b are held in the activated state. As a consequence, the intake and exhaust flow paths are configured substantially as shown in FIG. 9. Specifically, the intake and exhaust flow paths forms the two-cylinder interconnect configuration in which the burned gas discharged from the preceding cylinders (first and fourth cylinders) 2A, 2D is introduced into the respective following cylinders (second and third cylinders) 2B, 2C through the intercylinder gas channels 22 and the burned gas discharged from only the following cylinders 2B, 2C is led to the exhaust passage 20 provided with the three-way catalyst 24.

In this condition, fresh air is introduced through the intake passage 15 into the preceding cylinders 2A, 2D (arrows "a" in FIG. 9) in their intake stroke and the fuel is injected into the preceding cylinders 2A, 2D in their compression stroke, in which the amounts of injected fuel are feedback-controlled such that the air-fuel ratio detected by each linear $O_2$ sensor 25 becomes equal to the aforementioned specific "lean mixture" air-fuel ratio. The mixture is ignited at specific ignition points to produce stratified charge combustion at the "lean mixture" air-fuel ratio (refer to FIG. 10).

Subsequently, the burned gas discharged from the preceding cylinders 2A, 2D is introduced into the respective following cylinders 2B, 2C through the intercylinder gas channels 22 during periods when the exhaust stroke of the preceding cylinders 2A, 2D overlaps the intake stroke of the following cylinders 2B, 2C (arrows "b" in FIG. 9 and outline arrows in FIG. 10). The fuel is injected with appropriate timing (during the compression stroke, for example) into the following cylinders 2B, 2C, with the amounts of injected fuel controlled based on the output of the $O_2$ sensor 23, to achieve the stoichiometric air-fuel ratio by a combination of the burned gas of the "lean mixture" air-fuel ratio introduced from the preceding cylinders 2A, 2D and the newly supplied fuel, and the mixture is ignited at specific ignition points to produce combustion in the following cylinders 2B, 2C (refer to FIG. 10). After combustion in the following cylinders 2B, 2C, the resultant burned gas is discharged into the exhaust passage 20 provided with the three-way catalyst 24 (arrows "c" in FIG. 9).

Since stratified charge combustion is produced in the preceding cylinders 2A, 2D at a significantly large air-fuel ratio (lean mixture) as stated above, thermal efficiency is improved and pumping loss is reduced in the preceding cylinders 2A, 2D, and a combined effect thereof results in a remarkable improvement in fuel economy. In the following cylinders 2B, 2C, on the other hand, the mixture is combusted while being controlled to the stoichiometric air-fuel ratio with additional fuel supplied to the burned gas in an excess-air state. Therefore, although the thermal efficiency of the following cylinders 2B, 2C is slightly low compared to the preceding cylinders 2A, 2D in which the stratified charge combustion is produced at the "lean mixture" air-fuel ratio, it is possible to achieve an effect of sufficiently improving the fuel economy due to a reduction in pumping loss.

In addition, it is not necessary to provide a lean NOx catalyst unlike conventional lean burn engines and sufficient emission-cleaning performance is ensured with the three-way catalyst 24 alone, because the gas discharged from the following cylinders 2B, 2C into the exhaust passage 20 is at the stoichiometric air-fuel ratio.

As it is not necessary to provide the lean NOx catalyst as stated above, there is no need to temporarily lower the air-fuel ratio for accelerating release and reduction of NOx when the amount of NOx adsorbed by the lean NOx catalyst has increased, whereby a decrease in fuel economy improvement effect can be avoided. Moreover, the arrangement of the embodiment does not cause the earlier-mentioned sulfur-poisoning problem of the lean NOx catalyst.

Furthermore, NOx emission is sufficiently decreased in this embodiment. This is because the air-fuel ratio in the preceding cylinders 2A, 2D is made significantly large, i.e., approximately equal to twice the stoichiometric air-fuel ratio or larger, by keeping the amount of NOx generated in these cylinders 2A, 2D to a relatively low level, and the burned gas is introduced from the preceding cylinders 2A, 2D into the following cylinders 2B, 2C to create a condition equivalent to what would occur when a great deal of exhaust gas is introduced by EGR operation. The arrangement of the embodiment is advantageous for improving the quality of emissions from such a point of view as well.

The burned gas is introduced from the preceding cylinders 2A, 2D into the following cylinders 2B, 2C through the respective intercylinder gas channels 22 as stated above. Due to the provision of the intercylinder gas channels 22, a particular amount of heat corresponding to their lengths is dissipated. Accordingly, the temperature of the burned gas introduced into the following cylinders 2B, 2C can be regulated by properly setting the length of each intercylinder gas channel 22. Consequently, it is possible to maintain good ignitability and combustibility in the following cylinders 2B, 2C into which a great deal of exhaust gas is introduced by regulating the temperature of the burned gas in this way and also adjusting the timing of fuel injection into the following cylinders 2B, 2C as appropriate.

Although the stability of combustibility in the following cylinders 2B, 2C lessens when the ratio of excess air to the gas introduced from the preceding cylinders 2A, 2D into the following cylinders 2B, 2C decreases, the stability of combustibility in the following cylinders 2B, 2C is maintained if the air-fuel ratio in the preceding cylinders 2A, 2D is made significantly large, i.e., approximately equal to twice the stoichiometric air-fuel ratio or larger.

When the engine is in the operating range B on the high-load or high-speed side, on the other hand, the supply of the hydraulic oil to the first and second switching mechanisms 35a, 35b is interrupted with the control valves 37, 39 held in their closed state as stated earlier, so that the first intake valves 31a and the first exhaust valves 32a are held in the closed state and the second intake valves 31b and the second exhaust valves 32b are held in the activated state. As a consequence, the intake and exhaust flow paths are configured substantially as shown in FIG. 11. Specifically, the intake and exhaust flow paths forms the independent cylinder configuration in which the intake ports 11, 11a and the exhaust ports 12, 12a of the individual cylinders 2A–2D work independently of one another, so that fresh air is introduced through the intake passage 15, the branched intake channels 16 and the intake ports 11, 11a into the respective cylinders 2A–2D and the burned gas is discharged from the cylinders 2A–2D into the exhaust passage 20 through the respective exhaust ports 12, 12a.

As shown in the foregoing discussion, the individual cylinders 2A–2D of the aforementioned multicylinder (four-cylinder) spark-ignition engine undergo successive combustion cycles with specific phase delays. The engine is so constructed that it can be switched between the normal operation mode, in which the mixture is burned independently in the individual cylinders 2A–2D, and the special operation mode, in which the burned gas discharged from the preceding cylinders 2A, 2D in their exhaust stroke is introduced directly into the respective following cylinders 2B, 2C in their intake stroke. In the operating range B on the high-load or high-speed side of the engine, the intake and exhaust flow paths are set to form the independent cylinder configuration to introduce fresh air into the individual cylinders 2A–2D and the amount of intake air and the amount of injected fuel are so controlled as to produce an air-fuel ratio equal to or larger than the stoichiometric air-fuel ratio in the individual cylinders 2A–2D to provide engine output performance corresponding to the engine operating condition.

At engine startup, the intake and exhaust flow paths are set to the independent cylinder configuration by the flow path switching unit so that the preceding cylinders 2A, 2D and the following cylinders 2B, 2C work all independently, and the startup controller 52 performs combustion control operation in the normal operation mode. This arrangement effectively prevents engine misfire which could occur if the intake and exhaust flow paths are set to the two-cylinder interconnect configuration and a large amount of burned gas is introduced into the following cylinders 2B, 2C at engine startup. This is advantageous in ensuring ease of engine startup.

In this embodiment, the valve actuating mechanisms of the individual intake and exhaust valves are provided with actuating members including the lock pin 67 which shifts from the home position to the activated position as well as the first and second switching mechanisms 35a, 35b including the biasing member 73 which exerts the pushing force on the actuating members for causing them to automatically return to their home positions. Also, the aforementioned flow path switching unit is provided with a drive mechanism which causes the aforementioned actuating members to shift to the activated position overwhelming the pushing force exerted by the biasing member 73 by supplying the hydraulic oil to the first and second switching mechanisms 35a, 35b with the first and second control valves 37, 39 in the oil-feeding passages 36, 38 opened. This construction makes it possible to automatically set the aforementioned intake and exhaust flow paths to form the independent cylinder configuration at engine startup and perform the startup control operation quickly and properly.

More specifically, when the engine stops, the hydraulic oil supplied to the first and second switching mechanisms 35a, 35b by the aforementioned drive mechanism is interrupted and the actuating members including the lock pin 67 return to their home positions due to the pushing force of the biasing member 73. Consequently, the intake and exhaust flow paths are always set to the independent cylinder configuration shown in FIG. 11 at engine startup, in which the second intake valves 31b and the second exhaust valves 32b are held in their closed state and the first intake valves 31a and the first exhaust valves 32a driven by the cams 33a, 33b are caused to open and close. Thus, it is possible to perform the aforementioned combustion control operation in the normal operation mode, in which fresh air is introduced into the individual cylinders 2A–2D, immediately from engine startup without the need to switch the configuration of the intake and exhaust flow paths by the aforementioned flow path switching unit.

Figure 12:
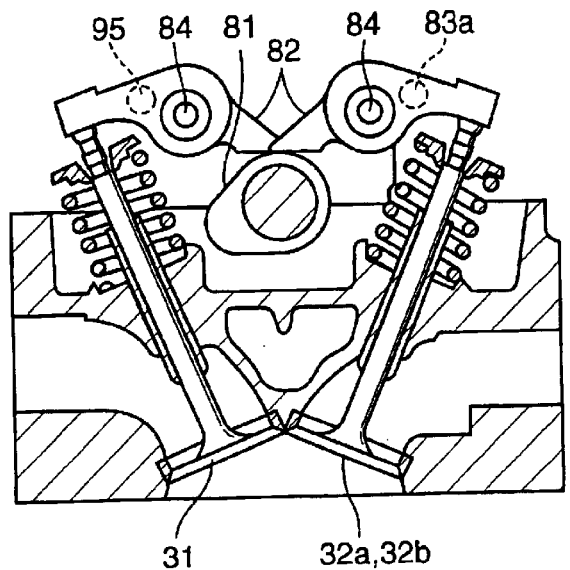
FIG. 12 is a sectional front view showing another specific construction of switching mechanisms provided for valve actuating mechanisms in one alternative of the embodiment.
Figure 13:
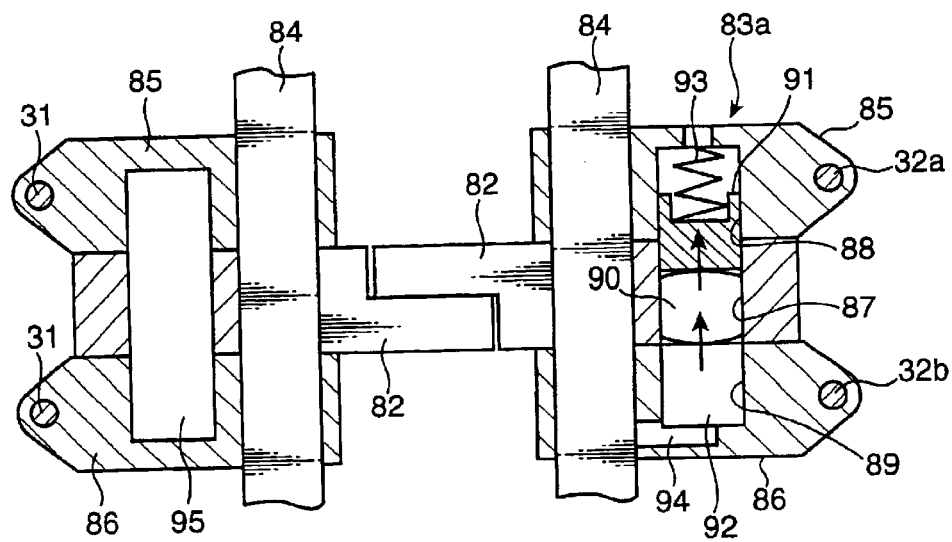
FIG. 13 is a sectional plan view showing the specific construction of the first switching mechanism.
Figure 14:
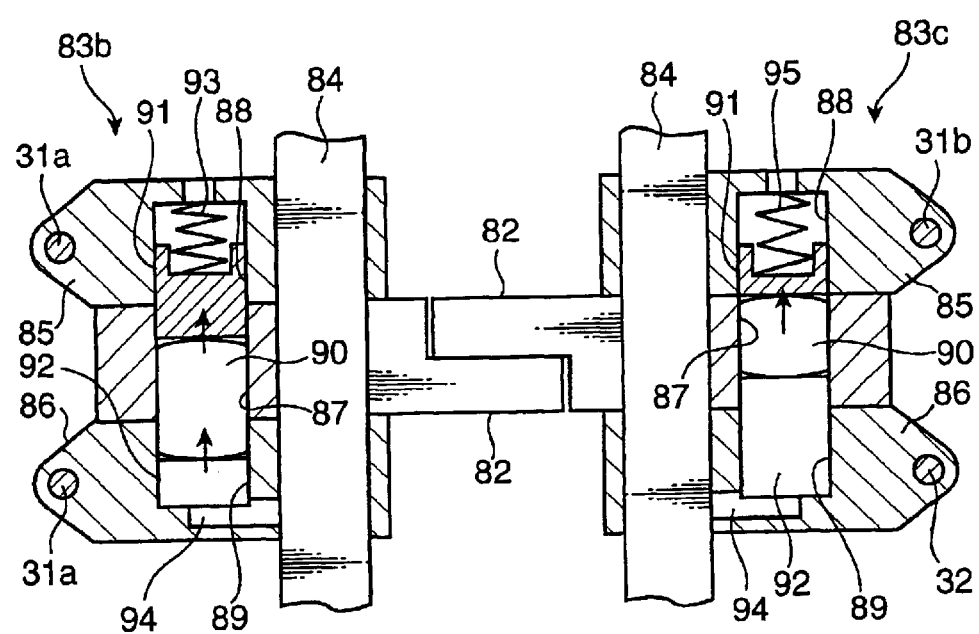
FIG. 14 is a sectional plan view showing the specific construction of the second and third switching mechanisms.

The engine of the foregoing embodiment is so constructed as to switch the configuration of the intake and exhaust flow paths by controlling the supply and drawing of the hydraulic oil to and from the first and second switching mechanisms 35a, 35b which are provided between the stem ends 74 of the individual intake and exhaust valves and the camshafts 34a, 34b. As an alternative, this construction may be modified as shown in FIGS. 12–14 so that the intake and exhaust flow paths are switched between the two-cylinder interconnect configuration and the independent cylinder configuration by first to third switching mechanisms 83a–83c provided at individual rocker arms 82 which, when driven by cams 81, actuate the aforementioned intake and exhaust valves. FIG. 13 shows the rocker arms 82 and the first switching mechanism 83a provided in the first cylinder 2A which serves as a preceding cylinder, and FIG. 14 shows the rocker arms 82 and the second and third switching mechanisms 83b, 83c provided in the second cylinder 2B which serves as a following cylinder.

As shown in FIG. 13, the first switching mechanism 83a is swingably supported by a support shaft 84 which serves as a pivot axis of the rocker arm 82. The first switching mechanism 83a includes first and second arms 85, 86 situated on both sides of an actuating portion of the rocker arm 82. There are formed lock holes 87–89 at corresponding positions in actuating portions of the two arms 85, 86 and the actuating portion of the rocker arm 82. A plunger 90, a first lock pin 91 for pushing the plunger 90 and a second lock pin 92 pushed by the plunger 90 are slidably fitted in these lock holes 87–89. Further, a biasing member 93 formed of a compression coil spring for exerting a pushing force on the first lock pin 91 against the plunger 90 is fitted in the lock hole 88 of the first arm 85.

Normally, a far end of the first lock pin 91 is forced by the pushing force of the biasing member 93 is into the lock hole 87 and the plunger 90 is accommodated in the lock hole 87 formed in the rocker arm 82, so that the rocker arm 82 and the first arm 85 are connected to each other and the rocker arm 82 is disconnected from the first arm 86. In this condition, an actuating force of the rocker arm 82 which is driven by the cam 81 is transmitted to the first exhaust valve 32a. As a consequence, the first exhaust valve 32a provided in the first exhaust port 12a which is connected to the exhaust passage 20 is caused to open and close. On the other hand, the actuating force of the rocker arm 82 is not transmitted to the second exhaust valve 32b so that the second exhaust valve 32b provided in the second exhaust port 12b which is connected to the intercylinder gas channel 22 is held in the closed state.

When hydraulic oil is supplied from an unillustrated oil-feeding passage into a hydraulic compartment 94 provided between the bottom of the lock hole 89 and a bottom end of the second lock pin 92, the first lock pin 91 is forced in the direction of arrows (FIG. 13) into the lock hole 88 formed in the first arm 85 against the pushing force exerted by the biasing member 93. Consequently, the first arm 85 is disconnected from the rocker arm 82, whereby the first exhaust valve 32a provided in the first exhaust port 12a which is connected to the exhaust passage 20 is held in the closed state. At the same point in time, a far end of the second lock pin 92 enters the lock hole 87 formed in the rocker arm 82 interconnecting the rocker arm 82 and the first arm 86, whereby the second exhaust valve 32b provided in the second exhaust port 12b which is connected to the intercylinder gas channel 22 is caused to open and close when a driving force is applied.

The two arms 85, 86 swingably supported by the support shaft 84 which serves as a pivot axis of the rocker arm 82 are joined by a connecting pin 95 to the actuating portion of the rocker arm 82 located on the side of a pair of intake valves 31 provided in the intake ports 11 which are connected to the intake passage 15. With this arrangement, the actuating force of the rocker arm 82 driven by the aforementioned cam 81 is transmitted to both of the intake valves 31, so that these intake valves 31 are caused to continuously open and close.

On the other hand, the second switching mechanisms 83b provided on the side of the first intake valves 31a of the following cylinders 2B, 2C are normally held in a condition where a bottom end of the plunger 90 has entered the lock hole 89 formed in the first arm 86 as shown in FIG. 14 so that the rocker arm 82 and the first arm 86 are interconnected. The second switching mechanism 83b is constructed in the same way as the first switching mechanism 83a except that the bottom end of the plunger 90 is accommodated in the lock hole 88 and the rocker arm 82 and the first arm 86 are disconnected when the hydraulic oil is supplied from the unillustrated oil-feeding passage into the hydraulic compartment 94 provided between the bottom of the lock hole 89 and the bottom end of the second lock pin 92.

The third switching mechanisms 83c provided on the side of the second intake valves 31b and the exhaust valves 32 of the following cylinders 2B, 2C are normally held in a condition where the first lock pin 91 is accommodated in the lock hole 89 formed in the first arm 85 so that the rocker arm 82 is disconnected from the first arm 85, and the far end of the second lock pin 92 enters the lock hole 87 formed in the rocker arm 82 so that the rocker arm 82 and the first arm 85 are always held in an interconnected state as shown in FIG. 14. The third switching mechanism 83c is constructed in the same way as the first switching mechanism 83a except that the far end of the plunger 90 enters the lock hole 88 formed in the first arm 85 interconnecting the rocker arm 82 and the first arm 85 when the hydraulic oil is supplied from the unillustrated oil-feeding passage into the hydraulic compartment 94 provided between the bottom of the lock hole 89 and the bottom end of the second lock pin 92.

With the provision of the aforementioned first to third switching mechanisms 83a–83c in the valve actuating mechanisms of the individual intake and exhaust valves, the engine is set to the independent cylinder configuration in which fresh air is introduced into the individual cylinders 2A–2D as shown in FIG. 11 under normal conditions where the supply of the hydraulic oil to the hydraulic compartments 94 is interrupted. At a point where the hydraulic oil is supplied to the hydraulic compartments 94, the engine is switched to the two-cylinder interconnect configuration, in which the burned gas discharged from the preceding cylinders (first and fourth cylinders) 2A, 2D is introduced into the respective following cylinders (second and third cylinders) 2B, 2C through the intercylinder gas channels 22 as shown in FIG. 9.

Figure 15:
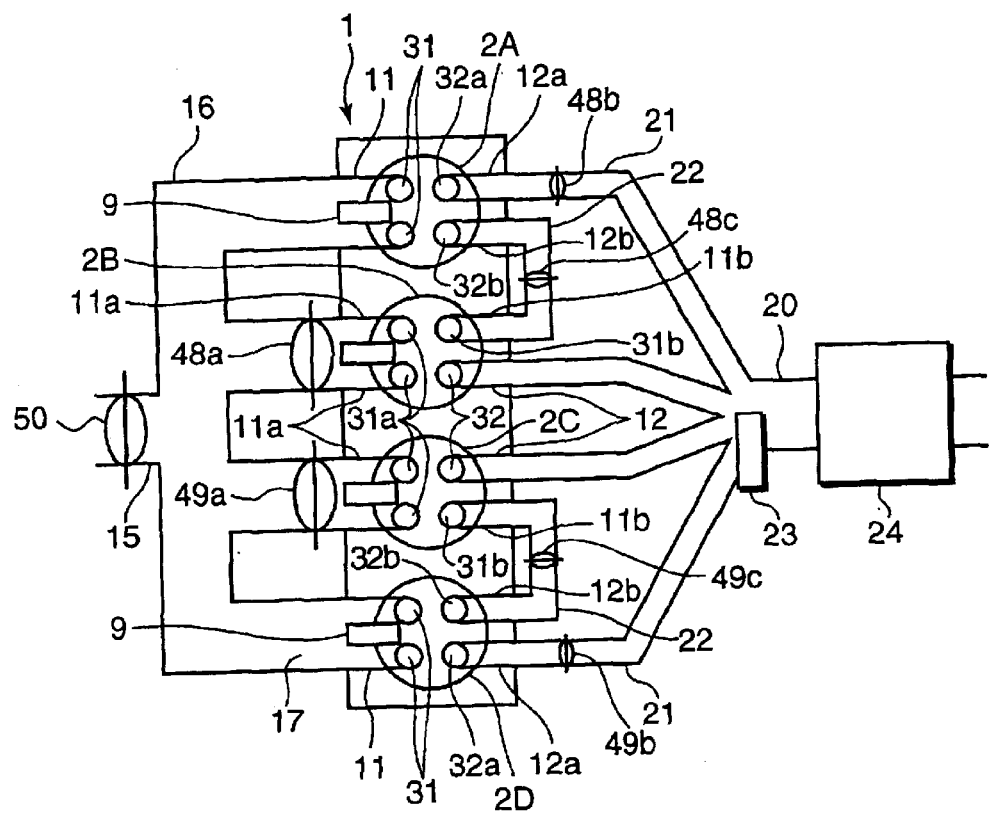
FIG. 15 is an explanatory diagram showing the configuration of intake and exhaust ports and intercylinder gas channels in another alternative of the embodiment.

In the aforementioned embodiment and the alternative thereof, the flow path switching unit is constructed by means of the first and second switching mechanisms 35a, 35b or the first to third switching mechanisms 83a–83c. In another alternative, a flow path switching unit may be constructed by means of on-off valves provided in intake and exhaust channels as shown in FIG. 15. Specifically, the flow path switching unit of this alternative (FIG. 15) includes intake on-off valves 48a, 49a provided in the branched intake channels 16 which are connected to the first intake ports 11a of the second and third cylinders 2B, 2C, exhaust on-off valves 48b, 49b provided in the branched exhaust channels 21 which are connected to the first exhaust ports 12a of the first and fourth cylinders (preceding cylinders) 2A, 2D, and gas channel on-off valves 48c, 49c provided in the intercylinder gas channels 22 which connect the first cylinder 2A to the second cylinder 2B and the fourth cylinder 2D to the third cylinder 2C.

In the operating range A on the low-load, low-speed side of the engine, unillustrated solenoid actuators drive the intake on-off valves 48a, 49a and the exhaust on-off valves 48b, 49b to closed positions which are their activated positions and the gas channel on-off valves 48c, 49c to open positions which are their activated positions in a controlled manner overwhelming the pushing forces exerted by the aforementioned biasing members. Note that a solenoid actuator (or solenoid actuators) is/are provided to the valves and a biasing member is provided to each of the valves. As a result, the engine is set to the two-cylinder interconnect configuration.

In the operating range B on the high-load or high-speed side, intake on-off valves 48a, 49a and the exhaust on-off valves 48b, 49b are held at open positions which are their home positions by the biasing members formed of unillustrated springs and the gas channel on-off valves 48c, 49c are held at closed positions which are their home positions. As a result, the engine is set to the independent cylinder configuration.

Figure 16:
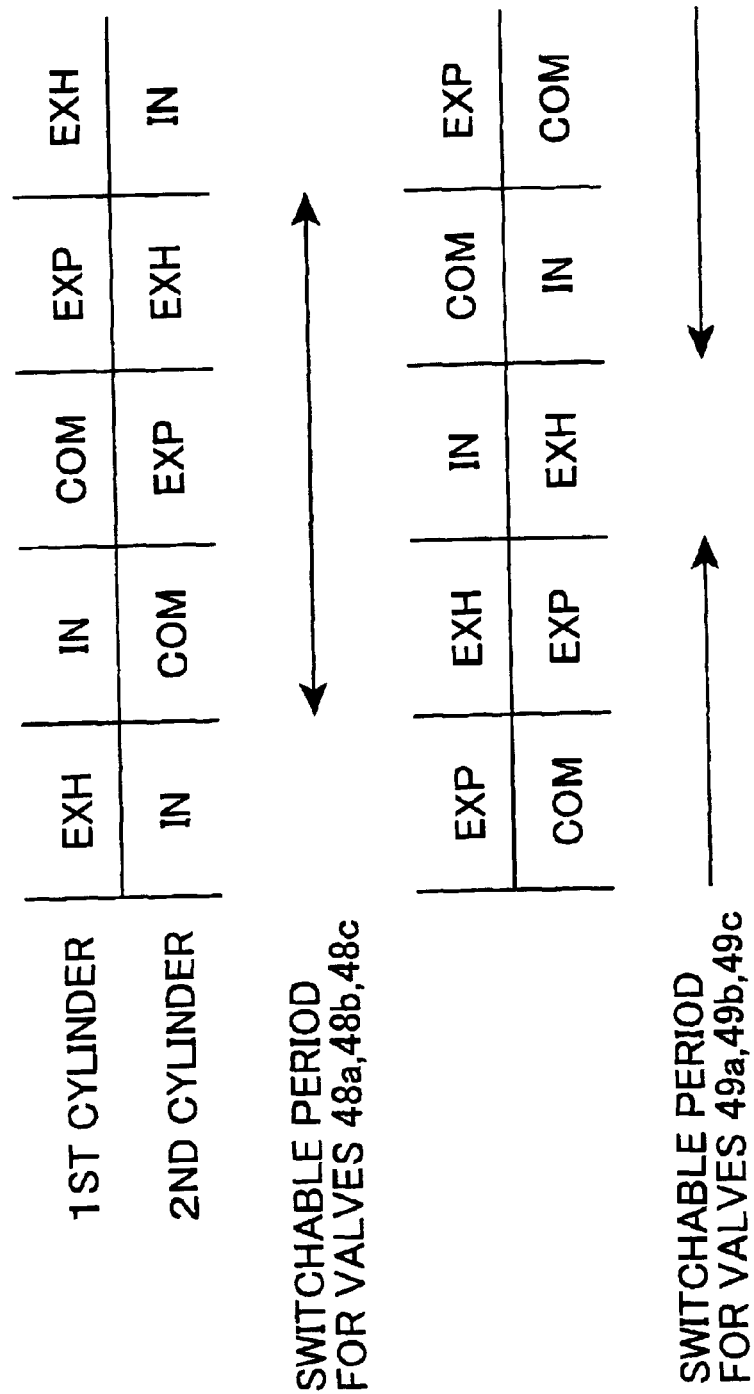
FIG. 16 is an explanatory diagram showing switchable periods during which on-off valves can be switched when engine operating condition has changed in the construction of FIG. 14.

When the engine operating condition is switched between the operating ranges A and B, the individual on-off valves 48a, 49a, 48b, 49b, 48c, 49c should be switched between their open and closed states during valve switchable periods shown in FIG. 16. Specifically, if the state of the individual on-off valves 48a, 49a, 48b, 49b, 48c, 49c is switched during a period when the exhaust stroke and the intake stroke of each pair of the preceding and following cylinders overlap, there arises a such problem that the burned gas drawn from the preceding cylinders 2A, 2D mixes with fresh air and they are introduced together into the following cylinders 2B, 2C. Thus, the on-off valves 48a, 48b, 48c should be switched within a period excluding the period when the exhaust stroke of the first cylinder 2A and the intake stroke of the second cylinder 2B overlap, and the on-off valves 48a, 48b, 48c should be switched within a period excluding the period when the exhaust stroke of the fourth cylinder 2D and the intake stroke of the third cylinder 2C overlap.

The on-off valves 48a, 49a, 48b, 49b, 48c, 49c and the controller for controlling them in this fashion together constitute the aforementioned flow path switching unit. The intake valves 31, the first and second exhaust valves 32a, 32b, the first and second intake valves 31a, 31b and the exhaust valves 32 provided in the ports of the individual cylinders 2A–2D are caused to continually open and close by unillustrated valve actuating mechanisms. Operation for controlling fuel injection from the individual fuel injectors 9 is the same as that of the foregoing embodiment. Designated by the numeral 50 in FIG. 15 is a throttle valve provided in the intake passage 15.

The engine is set to the two-cylinder interconnect configuration in the operating range A and extremely lean mixture combustion is produced in the preceding cylinders 2A, 2D in this alternative of the embodiment as well. In the operating range A, the burned gas discharged from the preceding cylinders 2A, 2D is introduced into the following cylinders 2B, 2C through the respective intercylinder gas channels 22, combustion in the following cylinders 2B, 2C is produced under conditions in which the stoichiometric air-fuel ratio has been produced by a combination of the burned gas of a "lean mixture" air-fuel ratio and newly supplied fuel, and the burned gas discharged from only the following cylinders 2B, 2C is led to the exhaust passage 20 provided with the three-way catalyst 24. In the operating range B, on the other hand, the engine is set to the independent cylinder configuration in which the intake ports 11, 11a and the exhaust ports 12, 12a of the individual cylinders 2A–2D work independently of one another, so that fresh air is introduced through the intake passage 15 and the intake ports 11, 11a into the respective cylinders 2A–2D and the burned gas discharged through the exhaust ports 12, 12a of the individual cylinders 2A–2D is led to the exhaust passage 20. This alternative of the embodiment provides the same operational and working effects as the earlier-mentioned basic embodiment as stated above.

According to this alternative of the embodiment, the construction of the flow path switching unit can be made relatively simple. When the engine operating condition is switched, the on-off valves 48a, 49a, 48b, 49b, 48c, 49c should just be switched during the switchable periods shown in FIG. 16 and extremely high accuracy is not required in their switching timing, so that their control operation is easy.

When the engine stops, the intake on-off valves 48a, 49a, the exhaust on-off valves 48b, 49b and the gas channel on-off valves 48c, 49c automatically return to their home positions due to the pushing forces exerted by the aforementioned biasing members. Consequently, the intake on-off valves 48a, 49a and the exhaust on-off valves 48b, 49b are set to their open positions and the gas channel on-off valves 48c, 49c are set to their closed positions. It is therefore possible to set the intake and exhaust flow paths to the independent cylinder configuration and, at engine startup, easily ensure ease of engine startup by introducing fresh air into the individual cylinders 2A–2D without the need to perform operation for actuating the individual on-off valves 48a, 49a, 48b, 49b, 48c, 49c by the aforementioned drive mechanism to shift them to their activated positions with a simple construction.

If it is possible to ensure ignitability even when the fuel is uniformly distributed in the following cylinders 2B, 2C, fuel injectors provided in the following cylinders 2B, 2C need not necessarily be of a type for injecting the fuel directly into these cylinders 2B, 2C. For example, the fuel injectors for supplying the fuel to the following cylinders 2B, 2C may be provided in the intercylinder gas channels 22 which serve as intake channels for the following cylinders 2B, 2C. In this variation of the embodiment, the fuel injectors supply the fuel into the following cylinders 2B, 2C in their intake stroke in a manner that matches the air-fuel ratio in the following cylinders 2B, 2C to the stoichiometric air-fuel ratio and produces uniform charge combustion therein.

According to this arrangement, heat of exhaust gas introduced from the preceding cylinders 2A, 2D into the following cylinders 2B, 2C is moderately dissipated, and the fuel is supplied to a great deal of ideal EGR gas in which excess air and burned gas are mixed during a process of introducing the gas into the following cylinders 2B, 2C. As a result, evaporation of the fuel and its mixing with the EGR gas are accelerated, and combustibility in the following cylinders 2B, 2C is further improved with a great deal of EGR gas introduced thereinto.

The control device of this invention is also applicable to other multicylinder engines than the four-cylinder engine. In a six-cylinder engine, for example, the exhaust stroke of one cylinder does not perfectly coincide in timing with the intake stroke of another cylinder. In such a case, each pair of preceding and following cylinders should be such that the exhaust stroke of one cylinder precedes and coincides in part with the intake stroke of the other cylinder.

This application is based on Japanese patent application serial no. 2002-193548, filed in Japan Patent Office on Jul. 02, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control device for a multicylinder spark-ignition engine of which individual cylinders undergo successive combustion cycles with specific phase delays, wherein the engine is switched depending on its operating conditions between a normal operation mode, in which combustion is produced with the individual cylinders set to work independently of one another, and a special operation mode, in which burned gas discharged from a preceding cylinder which is currently in an exhaust stroke is introduced directly into a following cylinder which is currently in an intake stroke, said control device comprising:

a flow path switching unit for switching intake and exhaust flow paths to form a two-cylinder interconnect configuration in the special operation mode such that the burned gas discharged from the preceding cylinder is introduced into the following cylinder through an intercylinder gas channel and an independent cylinder configuration in the normal operation mode such that fresh air is introduced into the individual cylinders; and an air-fuel ratio control unit for controlling the air-fuel ratio in the individual cylinders in such a manner that combustion in the preceding cylinder is produced under lean mixture conditions at an air-fuel ratio larger than the stoichiometric air-fuel ratio by a specific amount by injecting fuel directly into the preceding cylinder and combustion in the following cylinder is produced at an air-fuel ratio approximately equal to the stoichiometric air-fuel ratio by supplying the fuel together with the burned gas of a lean mixture state discharged from the preceding cylinder in the special operation mode;

wherein said flow path switching unit switches the intake and exhaust flow paths to the independent cylinder configuration at engine startup to perform combustion control operation in the normal operation mode.

2. The control device according to claim 1, said flow path switching unit including:

a switching mechanism having:
an actuating member which shifts from a home position where the intake and exhaust flow paths are set to the independent cylinder configuration to an activated position where the intake and exhaust flow paths are set to the two-cylinder interconnect configuration and a biasing member for exerting a pushing force on the actuating member to return it to the home position; and a drive mechanism for causing the actuating member to shift to the activated position;

wherein the actuating member is automatically returned to the home position due to the pushing force of the biasing member under normal conditions.

3. The control device according to claim 2, wherein the preceding cylinder is provided with an intake port connected to an intake passage, a first exhaust port connected to an exhaust passage, a second exhaust port connected to the intercylinder gas channel, a first exhaust valve for opening and closing the first exhaust port and a second exhaust valve for opening and closing the second exhaust port, and the following cylinder is provided with a first intake port connected to the intake passage, a second intake port connected to the intercylinder gas channel, an exhaust port connected to the exhaust passage, a first intake valve for opening and closing the first intake port and a second intake valve for opening and closing the second intake port, and wherein the switching mechanism for setting the intake and exhaust flow paths to the independent cylinder configuration by switching the first exhaust valve and the first intake valve to their activated state when an actuating member returns to the home position and by switching the second exhaust valve and the second intake valve to their closed state is provided in valve actuating mechanisms of the first and second exhaust valves and the first and second intake valves.

4. The control device according to claim 3, wherein a first switching mechanism for switching the first exhaust valve and the first intake valve to their activated state when an actuating member returns to its home position is provided in a first tappet portion for transmitting driving forces of cams to the first exhaust valve and the first intake valve, and a second switching mechanism for switching the second exhaust valve and the second intake valve to their closed state when an actuating member returns to its home position is provided in a second tappet portion for transmitting driving forces of cams to the second exhaust valve and the second intake valve.

5. The control device according to claim 3, wherein the switching mechanisms for switching the first exhaust valve and the first intake valve to their activated state and the second exhaust valve and the second intake valve to their closed state when actuating members return to their home positions are provided to rocker arms for transmitting driving forces of cams to the first and second exhaust valves and the first and second intake valves.

6. The control device according to claim 1, wherein the preceding cylinder is provided with an intake port connected to an intake passage, a first exhaust port connected to an exhaust passage and a second exhaust port connected to the intercylinder gas channel, and the following cylinder is provided with a first intake port connected to the intake passage, a second intake port connected to the intercylinder gas channel and an exhaust port connected to the exhaust passage, said flow path switching unit including:
- an intake on-off valve provided in a branched channel of the intake passage connected to the first intake port of the following cylinder;
- an exhaust on-off valve provided in a branched channel of the exhaust passage connected to the second exhaust port of the preceding cylinder;
- a gas channel on-off valve provided in the intercylinder gas channel;
- a first biasing member for exerting a pushing force on the intake on-off valve and the exhaust on-off valve toward open positions which are their home positions under normal conditions;
- a second biasing member for exerting a pushing force on the gas channel on-off valve toward a closed position which is its home position;
- a first solenoid actuator for driving the intake on-off valve and the exhaust on-off valve toward closed positions which are their activated positions against the pushing forces exerted by the biasing members; and
- a second solenoid actuator for driving the gas channel on-off valve toward an open position which is its activated position.

7. The control device for the spark-ignition engine according to claim 1, wherein a three-way catalyst is provided in an exhaust passage, the preceding cylinder is provided with an intake port connected to an intake passage, a first exhaust port connected to the exhaust passage, a second exhaust port connected to the intercylinder gas channel, a first exhaust valve for opening and closing the first exhaust port and a second exhaust valve for opening and closing the second exhaust port, and the following cylinder is provided with a first intake port connected to the intake passage, a second intake port connected to the intercylinder gas channel, an exhaust port connected to the exhaust passage, a first intake valve for opening and closing the first intake port and a second intake valve for opening and closing the second intake port, said flow path switching unit including:
- a switching mechanism having an actuating member which shifts from a home position where the intake and exhaust flow paths are set to the independent cylinder configuration with the first exhaust valve and the first intake valve set to their activated state to an activated position where the intake and exhaust flow paths are set to the two-cylinder interconnect configuration with the first exhaust valve and the first intake valve set to their closed state, and a biasing member for exerting a pushing force on the actuating member to return it to the home position; and
- a drive mechanism for causing the actuating member to shift to the activated position; and
- wherein said flow path switching unit switches the intake and exhaust flow paths to the independent cylinder configuration by causing the actuating member to automatically return to the home position due to the pushing force of the biasing member at engine startup to perform the combustion control operation in the normal operation mode.

* * * * *